United States Patent
Medard et al.

(10) Patent No.: US 11,431,368 B2
(45) Date of Patent: Aug. 30, 2022

(54) NOISE RECYCLING

(71) Applicants: Massachusetts Institute of Technology, Cambridge, MA (US); National University of Ireland, Maynooth, Maynooth (IE)

(72) Inventors: Muriel Medard, Belmont, MA (US); Kenneth R. Duffy, Dublin (IE); Amit Solomon, Cambridge, MA (US); Alejandro Cohen, Brookline, MA (US)

(73) Assignees: Massachusetts Institute of Technology, Cambridge, MA (US); National University of Ireland, Maynooth, Maynooth (IE)

( * ) Notice: Subject to any disclaimer, the term of this patent is extended or adjusted under 35 U.S.C. 154(b) by 0 days.

(21) Appl. No.: 17/202,860

(22) Filed: Mar. 16, 2021

(65) Prior Publication Data
US 2021/0288685 A1 Sep. 16, 2021

Related U.S. Application Data

(60) Provisional application No. 62/990,140, filed on Mar. 16, 2020.

(51) Int. Cl.
*H04B 1/12* (2006.01)
*H04B 1/10* (2006.01)

(52) U.S. Cl.
CPC .......... *H04B 1/123* (2013.01); *H04B 1/1027* (2013.01)

(58) Field of Classification Search
CPC ........ H04B 1/10; H04B 10/12; H04B 1/1027; H04B 1/123; H04B 7/14; H04W 52/04; H04W 52/08
See application file for complete search history.

(56) References Cited

U.S. PATENT DOCUMENTS 6,138,264 A 10/2000 Nava et al.
6,511,280 B1 1/2003 Sammartino et al.
(Continued)

FOREIGN PATENT DOCUMENTS

EP 1819058 8/2007
WO WO 2021/115670 A1 6/2021

OTHER PUBLICATIONS

Akin, et al.; "Training Optimization for Gauss-Markov Rayleigh Fading Channels"; IEEE Communication Society; pp. 5999-6004; Jan. 2007; 6 Pages.
(Continued)

*Primary Examiner* — Thanh C Le
(74) *Attorney, Agent, or Firm* — Daly, Crowley, Mofford & Durkee LLP

(57) ABSTRACT

Described are concepts, systems, devices and methods that enhance decoding performance of channels subject to correlated noise. The concepts, systems, devices and methods can be used with any combination of codes, code-rates and decoding techniques. In embodiments, a continuous realization of effective noise is estimated from a lead channel by subtracting its decoded output from its received signal. This estimate is then used to improve the accuracy of decoding of an otherwise orthogonal channel that is experiencing correlated effective noise. In this approach, channels aid each other through the post-decoding provision of estimates of effective noise. In some embodiments, the lead channel is not pre-determined, but is chosen dynamically based on which of a plurality of decoders completes first, or using soft information including an estimate of effective noise that is least energetic or most likely to have occurred.

36 Claims, 10 Drawing Sheets

(56) References Cited

U.S. PATENT DOCUMENTS

| | | | |
|---|---|---|---|
| 6,625,226 | B1 | 9/2003 | Gersho et al. |
| 7,209,867 | B2 | 4/2007 | Vigoda et al. |
| 7,860,687 | B2 | 12/2010 | Vigoda et al. |
| 8,479,085 | B2 | 7/2013 | Jo et al. |
| 8,851,382 | B2 | 10/2014 | Powers et al. |
| 9,246,156 | B2 | 1/2016 | Kwag et al. |
| 9,432,059 | B1 | 8/2016 | Sakamoto |
| 9,769,003 | B2 | 9/2017 | Bogdan |
| 9,998,148 | B2 | 6/2018 | Lin et al. |
| 10,311,243 | B2 | 6/2019 | Calmon et al. |
| 10,491,432 | B1 | 11/2019 | Medra et al. |
| 10,608,672 | B2 | 3/2020 | Medard et al. |
| 10,608,673 | B2 | 3/2020 | Medard et al. |
| 10,944,610 | B2 | 3/2021 | Medard et al. |
| 11,095,314 | B2 | 8/2021 | Medard et al. |
| 11,115,086 | B1* | 9/2021 | Berliner ............ H04L 27/2657 |
| 2002/0046382 | A1 | 4/2002 | Yang |
| 2002/0154716 | A1* | 10/2002 | Erving ................. H04L 1/006 375/348 |
| 2002/0161560 | A1 | 10/2002 | Abe et al. |
| 2003/0186659 | A1* | 10/2003 | Kolze ................. H04L 1/0047 455/132 |
| 2004/0264555 | A1 | 12/2004 | Hegde et al. |
| 2005/0281348 | A1* | 12/2005 | Kim ..................... H04L 1/0643 375/267 |
| 2006/0070256 | A1 | 4/2006 | Weissman et al. |
| 2006/0070257 | A1 | 4/2006 | Weissman et al. |
| 2006/0123277 | A1 | 6/2006 | Hocevar |
| 2006/0224307 | A1* | 10/2006 | Schmidt ................ G01S 5/0215 701/516 |
| 2007/0011568 | A1 | 1/2007 | Hocevar |
| 2007/0041458 | A1 | 2/2007 | Hocevar et al. |
| 2007/0086539 | A1 | 4/2007 | Hocevar |
| 2008/0075206 | A1 | 3/2008 | Ordentlich et al. |
| 2009/0249159 | A1 | 10/2009 | Lee et al. |
| 2010/0074319 | A1 | 3/2010 | Tseng et al. |
| 2010/0223534 | A1 | 9/2010 | Earnshaw et al. |
| 2011/0072330 | A1 | 3/2011 | Kolze |
| 2014/0146969 | A1 | 5/2014 | Sadot et al. |
| 2015/0236726 | A1 | 8/2015 | Sankaranarayanan et al. |
| 2016/0329978 | A1 | 11/2016 | Zukunft et al. |
| 2017/0134193 | A1 | 5/2017 | Sugihara |
| 2018/0226999 | A1 | 8/2018 | Wang et al. |
| 2018/0254882 | A1 | 9/2018 | Bogdan |
| 2019/0116560 | A1* | 4/2019 | Naderializadeh ... H04W 52/346 |
| 2019/0199473 | A1 | 6/2019 | Medard et al. |
| 2019/0260441 | A1* | 8/2019 | Akuon ................. H04B 7/0482 |
| 2020/0106506 | A1 | 4/2020 | Bhamidipati et al. |
| 2021/0336645 | A1* | 10/2021 | Brifman ................. H04B 1/123 |
| 2021/0384918 | A1 | 12/2021 | Solomon et al. |
| 2021/0392025 | A1* | 12/2021 | Touboul ............ H04L 27/3422 |
| 2022/0014214 | A1 | 1/2022 | Medard et al. |

OTHER PUBLICATIONS

Anderson, et al.; "Optimal Filtering"; IEEE Transactions on Systems, Man, and Cybernetics; vol. SMC-12; No. 2; pp. 235-236; Mar./Apr. 1982; 2 Pages.
Arikan; "Channel Polarization: A Method for Constructing Capacity-Achieving Codes"; ISIT 2008; pp. 1173-1177; Jul. 6-11, 2008; 5 Pages.
Medard, et al.; "Bandwidth Scaling for Fading Multipath Channels"; IEEE Transactions on Information Theory; vol. 48; No. 4; pp. 840-851; Apr. 2002; 13 Pages.
Duffy, et al.; "Capacity-Achieving Guessing Random Additive Noise Decoding"; IEEE Transactions on Information Theory; vol. 65; No. 7; pp. 4023-4040; Jul. 2019; 18 Pages.
Duffy, et al.; "Guessing noise, not code-words"; 2018 IEEE International Symposium on Information Theory (ISIT); pp. 671-675; Jan. 2018; 5 Pages.
Duffy; "Ordered Reliability Bits Guessing Random Additive Noise Decoding"; Oct. 4, 2020; 5 Pages.
Abou-Faycal, et al.; "Binary Adaptive Coded Pilot Symbol Assisted Modulation Over Rayleigh Fading Channels Without Feedback"; IEEE Transactions on Communications; vol. 53; No. 6; pp. 1036-1046; Jun. 2005; 11 Pages.
Gallager; "A Perspective on Multiaccess Channels"; IEEE Transactions on Information Theory; vol. IT-31; No. 2; Mar. 1985; pp. 124-142; 19 Pages.
Kaye, et al.; "Relationship Between LMS Compensators for Intersymbol Interference in Linear and Nonlinear Modulation Schemes"; IEEE Transactions on Information Theory; pp. 244-246; Mar. 1973; 3 Pages.
Li, et al.; "A Successive Decoding Strategy for Channels with Memory"; IEEE Transactions on Information Theory; vol. 53; Issue 2; Jan. 22, 2007; 5 Pages.
Li, et al.; "Approaching Capacity on Noncoherent Block Fading Channels with Successive Decoding"; IEEE ICC; pp. 1416-1420; Jan. 2006; 5 Pages.
Li, et al.; "Design and Analysis of Successive Decoding with Finite Levels for the Markov Channels"; May 5, 2009; 22 Pages.
Li, et al.; "Successive Decoding for Finite State Markov Modelled Flat Fading Channels"; ISIT 2006; Jul. 9-14, 2006; 5 Pages.
Liang, et al.; "Hardware Efficient and Low-Latency CA-SCL Decoder Based on Distributed Sorting"; Jan. 2016; 6 Pages.
Narayanan, et al.; "A BCJR-DFE Based Receiver for Achieving Near Capacity Performance on Inter Symbol Interference Channels"; Jan. 2004; 10 Pages.
Nevat, et al.; "Channel Tracking Using Pruning for MIMO-OFDM Systems Over Gaus-Markov Channels"; ICASS; III-196-III-196; Jan. 2007; 4 Pages.
Niu, et al.; "CRC-Aided Decoding of Polar Codes"; IEEE Communications Letters; vol. 16; No. 10; pp. 1668-1671; Oct. 2012; 4 Pages.
Solomon, et al.; "Soft Maximum Likelihood Decoding using GRAND"; Jan. 9, 2020; 6 Pages.
Stimming, et al.; "LLR-Based Successive Cancellation List Decoding of Polar Codes"; IEEE Transactions on Signals Processing; vol. 63; No. 19; pp. 5165-5179; Oct. 1, 2015; 15 Pages.
Tai, et al.; "List Decoding of Polar Codes"; 2011 IEEE International Symposium on Information Theory Proceedings; pp. 1-5; Jan. 2011; 5 Pages.
Yang; "A Road to Future Broadband Wireless Access: MIMO-OFDM-Based Air Interface"; Wireless Communications In China: Technology vs. Markets; IEEE Communications Magazine; pp. 53-60; Jan. 2005; 8 Pages.
U.S. Appl. No. 17/636,587, filed Feb. 18, 2022, Duffy.
U.S. Non-Final Office Action dated Aug. 14, 2019 for U.S. Appl. No. 16/026,811; 9 Pages.
Response to Non-Final Office Action dated Aug. 14, 2019 for U.S. Appl. No. 16/026,811 as filed Oct. 4, 2019; 5 Pages.
Notice of Allowance dated Dec. 17, 2019 for U.S. Appl. No. 16/026,811; 7 pages.
U.S. Non-Final Office Action dated Oct. 28, 2019 for U.S. Appl. No. 16/026,822; 6 pages.
Response to Non-Final Office Action dated Oct. 28, 2019 for U.S. Appl. No. 16/026,822, filed Nov. 7, 2019; 2 pages.
Notice of Allowance dated Dec. 4, 2019 for U.S. Appl. No. 16/026,822; 5 pages.
U.S. Non-Final Office Action dated Oct. 29, 2020 for U.S. Appl. No. 16/765,083; 12 Pages.
Response to Non-Final Office Action dated Oct. 29, 2020 for U.S. Appl. No. 16/765,083 as filed Dec. 1, 2020; 7 Pages.
Notice of Allowance dated Dec. 11, 2020 for U.S. Appl. No. 16/765,083; 13 Pages.
U.S. Non-Final Office Action dated Feb. 4, 2021 for U.S. Appl. No. 16/793,224; 20 Pages.
Response to U.S. Non-Final Office Action dated Feb. 4, 2021 for U.S. Appl. No. 16/793,224; Response filed Mar. 31, 2021; 7 Pages.
Notice of Allowance dated Apr. 12, 2021 for U.S. Appl. No. 16/793,224; 8 Pages.
Preliminary Amendment dated Oct. 20, 2021 for U.S. Appl. No. 17/371,925; 5 Pages.
Communication Pursuant to Rules 161(1) and 162 EPC for European Application No. 18834223.2 dated Jul. 29, 2020; 3 Pages.

(56) References Cited

OTHER PUBLICATIONS

Response (with amended claims and descriptions) to Communication Pursuant to Rules 161(1) and 162 EPC for European Application No. 18834223.2 dated Jul. 29, 2020; Response filed Oct. 23, 2020; 22 Pages.
Communication Under Rule 71(3) EPC Intention to Grant for European Application No. 18834223.2 dated Oct. 5, 2021; 7 Pages.
PCT International Search Report dated Apr. 4, 2019, for Application No. PCT/US2018/066810; 5 Pages.
PCT Written Opinion of the International Searching Authority dated Apr. 4, 2019, for Application No. PCT/US2018/066810; 9 Pages.
International Preliminary Report on Patentability dated Jul. 2, 2020 for International Application No. PCT/US2018/066810; 8 Pages.
International Preliminary Report on Patentability dated Jul. 2, 2020 for International Application No. PCT/US2018/066813; 8 Pages.
PCT International Search Report dated Apr. 4, 2019, for Application No. PCT/US2018/066813; 5 Pages.
PCT Written Opinion of the International Searching Authority dated Apr. 4, 2019, for Application No. PCT/US2018/066813; 9 Pages.
International Search Report and Written Opinion dated Jun. 30, 2021 for International Application No. PCT/US21/26412; 8 Pages.
International Search Report and Written Opinion for International Patent Application No. PCT/EP2020/079671 dated Jan. 18, 2021; 20 Pages.
Tillich, Jean-Pierre; "Lecture 8: Polar Codes"; Information Theory; Nov. 18, 2016; 41 Pages.
Azar, et al.; "On the Equivalence Between Maximum Likelihood and Minimum Distance Decoding Binary Contagion and Queue-Based Channels with Memory;" IEEE Transactions on Communication; vol. 63; No. 1; Jan. 2011; 10 pages.
Campos; "Understanding the 5G NR Physical Layer;" Keysight Technologies; Nov. 1, 2017; 111 Pages.
Chase, "A Class of Algorithms for Decoding Block Codes with Channel Measurement Information"; IEEE Transactions on Information Theory, vol. IT-18, No. 1; Jan. 1972; 13 Pages.
Duffy et al., "Guessing Random Additive Noise Decoding with Symbol Reliability Information (SRGRAND)"; https://arxiv.org/; Nov. 25, 2019; 18 Pages.
Duffy, "Ordered Reliability Bits Guessing Random Additive Noise Decoding"; https://arxiv.org/; Jan. 2, 2020;6 Pages.
Duffy, et al. "Capacity-achieving Guessing Random Additive Noise Decoding (GRAND)"; arXiv:1802.07010v4; Cornell University Library; Feb. 20, 2018; 21 Pages.
Duffy, et al.; "Guessing noise, not code-words"; 2018 IEEE International Symposium on Information Theory (ISIT); Jun. 17-22, 2018; 5 Pages.
ETSI; "5G; NR; Physical layer procedures for control"; 3 GPP TS 38.213 version 15.2.0 Release 15; Jul. 2018; 101 Pages.
Kavcic, et al.; "The Viterbi Algorithm and Markov Noise Memory"; IEEE Transactions on Information Theory; vol. 46; No. 1; pp. 291-301; Jan. 1, 2000; 11 Pages.
Mani, "Symbol-Level Stochastic Chase Decoding of Reed-Solomon and BCH Code"; IEEE Transactions on Communications, vol. 67, No. 8, Aug. 2019; 12 Pages.
Silverman et al.; "Coding for Constant-Data-Rate Systems"; IRE Professional Group on Information Theory, IEEE, vol. 4, No. 4; Sep. 1, 1954; 14 Pages.
Solomon et al.; "Soft Maximum Likelihood Decoding using GRAND", [online] InICC 2020-2020, IEEE International Conference on Communications (ICC); Jan. 9, 2020; 6 Pages.
Valembois, Antoine et al. "An Improved Method to Compute Lists of Binary Vectors that Optimize a Given Weight Function with Application to Soft-Decision Decoding" IEEE Communications Letters, vol. 5, No. 11; Nov. 2001; 3 Pages.

* cited by examiner

Algorithm 1 Noise recycling with racing

Input: $\vec{y}_1, \ldots, \vec{y}_m$
Output: $\hat{\vec{c}}_1, \ldots, \hat{\vec{c}}_m$ 1: Decode orthogonal channel outputs
2: $i \leftarrow$ # of decoder that won the decoding race
3: $\hat{\vec{c}}_i \leftarrow$ i-th decoded codeword
4: $\hat{\vec{x}}_i \leftarrow$ encode of $\hat{\vec{c}}_i$
5: $\hat{\vec{z}}_i \leftarrow \vec{y}_i - \hat{\vec{x}}_i$
6: for $j = 1 \rightarrow \max\{m - i, i - 1\}$ do
7:     if $i + j \leq m$ then
8:        $[\hat{\vec{c}}_{i+j}, \hat{\vec{z}}_{i-j}] \leftarrow$ DecodeAndEst. $(\vec{y}_{i+j}, \hat{\vec{z}}_{i+j-1})$
9:     end if
10:    if $i - j \geq 1$ then
11:       $[\hat{\vec{c}}_{i-j}, \hat{\vec{z}}_{i-j}] \leftarrow$ DecodeAndEst. $(\vec{y}_{i-j}, \hat{\vec{z}}_{i-j+1})$
12:    end if
13: end for
14: return $\hat{\vec{c}}_1, \ldots, \hat{\vec{c}}_m$ procedure DECODEANDEST. $(\vec{y}, \hat{\vec{z}}, j)$
        $\hat{\vec{y}} \leftarrow \vec{y} - p\hat{\vec{z}}$
        Decode orthogonal channel j using $\hat{\vec{y}}$
        $\hat{\vec{c}} \leftarrow$ decoded codeword
        $\hat{\vec{x}} \leftarrow$ encode of $\hat{\vec{c}}$
        $\hat{\vec{z}} \leftarrow \vec{y} - \hat{\vec{x}}$
        return $\hat{\vec{c}}, \hat{\vec{z}}$
    end procedure

*FIG. 5*

NOISE RECYCLING

CROSS-REFERENCE TO RELATED APPLICATION

This application claims the benefit of U.S. Provisional Application 62/990,140 filed Mar. 16, 2020, the entire contents of which are incorporated by reference herein.

GOVERNMENT RIGHTS

This invention was made with Government support under Grant No. HR0011-17-C-0050 awarded by the Defense Advanced Research Projects Agency (DARPA). The Government has certain rights in the invention.

BACKGROUND

As is known in the art, the use of orthogonal channels in communication systems is commonplace in systems having wired and/or wireless channels. Examples include the widespread use of orthogonal frequency division multiplexing (OFDM), and of orthogonal schemes in multiple access, such as frequency division multiple access (FDMA), time-division multiplexing (TDM), time-division multiple access (TDMA), interleaving over time or frequency, packetized access, or code-division multiple access (CDMA) schemes. In OFDM or FDMA, or frequency interleaving, or packetized access, channels separated by less than a coherence band will experience the effect of correlated noise, possibly in the form of correlated fading. In TDMA, time interleaving, or packetized access, channels separated by less than a coherence time will experience effective correlated noise, possibly in the form of correlated fading.

SUMMARY OF DISCLOSED EMBODIMENTS

While joint decoding of all orthogonal or quasi-orthogonal channels can, in theory, make use of such correlated noise to improve performance, it is challenging to implement efficiently in practice and, indeed, runs counter to the reason for seeking orthogonality in the first place.

Accordingly, described herein are systems, devices, and methods to recycle noise in orthogonal channels in order to improve communication performance for any combination of codes. With this approach the performance improvement may be twofold: (1) improvement in rate gain aspect; and (2) improvement in reliability.

In contrast to prior art techniques, in a noise recycling approach, modulated decoded codewords are subtracted from a received signal to recover an estimate of effective noise, whether the effect is caused by actual noise in a channel or by processing of received signals. That estimate is a component of the effective noise in another as-yet, un-decoded orthogonal channel, because the channels are correlated. In accordance with the concepts described herein, it has been recognized that a portion of the estimate can, therefore, be subtracted from the received signal on the orthogonal channel before decoding that channel, thereby reducing the latter's effective noise.

In embodiments, orthogonal or quasi-orthogonal correlated channels may be used (i.e. channels in which signals that are sent using different channels is completely independent, or only weakly interfering). In embodiments, the described noise recycling techniques may be used in wireless communications networks.

In general, the described noise recycling systems and techniques lead to a benefit of correlation among orthogonal channels. In embodiments, orthogonal channels in e.g. an OFDM or a TDMA system, for example, or quasi-orthogonal channels in e.g. a CDMA system, may be chosen with a preference for noise correlation among them, with attendant effects in terms of rate and power allocation among orthogonal channels.

In one aspect of the concepts described herein a noise recycling method comprises in a first (or lead) channel, channel subtracting a decoded output signal from a received signal, based upon the subtracted signal, estimating a continuous realization of effective noise of the lead channel and utilizing the estimate to improve the accuracy of decoding of an orthogonal channel that is experiencing correlated effective noise.

With this particular arrangement, enhanced decoding performance of channels subject to correlated effective noise without joint decoding is provided. The method can be used with any combination of codes, code-rates and decoding techniques.

In embodiments, channels may aid each other through the provision of only estimates of effective noise, post-decoding.

In systems which may be modeled with a Gauss-Markov model of correlated effective noise, noise recycling employing a successive order enables higher rates than without recycling noise. In embodiments, noise recycling can be employed with any code and decoder, and noise recycling shows block error rate (BLER) benefits when applying the same predetermined order as used to enhance the rate region.

In embodiments, for short codes, an additional BLER improvement is possible through noise recycling with racing, where the lead channel is not pre-determined, but is instead dynamically selected (i.e. chosen "on-the-fly") based upon which decoder of a plurality of decoders first completes a decoding operation.

Thus, a first embodiment is a system for decoding signals. The system has one or more antennas for receiving a plurality of channels having correlated, effective noise. The system also has a lead channel selector for determining a lead channel in the plurality of channels. The system further has a first decoder for decoding signals in the lead channel to form a first decoded codeword. The system also has a subtraction unit for determining an estimate of effective noise on the lead channel by subtracting the first decoded codeword from the signals received in the lead channel. And the system has a second decoder for decoding signals in another channel in the plurality of channels using the determined estimate of effective noise on the lead channel to form a second decoded codeword.

In some embodiments, the plurality of channels would be orthogonal or quasi-orthogonal but for the correlated, effective noise.

In some embodiments, the plurality of channels comprises a wireless, multiple access channel.

In some embodiments, the plurality of channels comprise: an orthogonal frequency-division multiplexing (OFDM) channel, or a frequency-division multiple access (FDMA) channel, or a time-division multiplexing (TDM) channel, or a time-division multiple access (TDMA) channel, or a channel that interleaves data over time or frequency, or a packetized access channel, or a code-division multiple access (CDMA) channel, or any combination thereof.

In some embodiments, the lead channel selector operates by selecting, prior to decoding, a given channel in the plurality of channels as the lead channel.

In some embodiments, the given channel has a lowest code rate among the plurality of channels.

In some embodiments, the lead channel selector operates by (a) receiving parallel decodings of the signals received by the one or more antennas, and (b) selecting a channel in the plurality of channels as the lead channel on the basis of the parallel decodings.

In some embodiments, the lead channel selector operates by selecting the channel whose decoding completed first.

In some embodiments, the lead channel selector operates using soft information.

In some embodiments, the soft information comprises a least energetic estimated effective noise sequence.

In some embodiments, the soft information comprises a most likely effective noise sequence.

Some embodiments also have a second subtraction unit for determining an estimate of effective noise on the other channel by subtracting the second decoded codeword from the signals in the other channel. The first decoder is configured for re-decoding the signals in the lead channel using the determined estimate of effective noise on the other channel to form a third decoded codeword that is different than the first decoded codeword.

In some embodiments, the plurality of channels comprise a plurality of time slots created by time division multiplexing, and the correlated, effective noise comprises burst noise.

In some embodiments, which are part of a multiple-input multiple-output (MIMO) system, the correlated, effective noise comprises effective noise relating to signals received by each of the one or more antennas.

In some embodiments comprising a plurality of nodes, each node having a plurality of antennas, two or more of the nodes share with each other information regarding effective noise that they have received by their respective plurality of antennas.

Some embodiments include a plurality of additional decoders for decoding signals in respective additional channels in the plurality of channels, each such additional decoder using a determined estimate of effective noise on another decoder.

In some embodiments, the first and second decoders further perform successive interference cancellation (SIC) on the plurality of channels.

In some embodiments, the first and second decoder are configured for decoding signals according to an interleaving of the plurality of channels.

Another embodiment is a method of decoding signals. The method begins with receiving a plurality of channels having correlated, effective noise. The method continues with determining a lead channel in the plurality of channels. Next, the method requires decoding signals in the lead channel to form a first decoded codeword. Then, the method calls for determining an estimate of effective noise on the lead channel by subtracting the first decoded codeword from the signals received in the lead channel. Finally, the method includes decoding signals in another channel in the plurality of channels using the determined estimate of effective noise on the lead channel to form a second decoded codeword.

In some embodiments, the plurality of channels would be orthogonal or quasi-orthogonal but for the correlated, effective noise.

In some embodiments, the plurality of channels comprises a wireless, multiple access channel.

In some embodiments, the plurality of channels comprise: an orthogonal frequency-division multiplexing (OFDM) channel, or a frequency-division multiple access (FDMA) channel, or a time-division multiplexing (TDM) channel, or a time-division multiple access (TDMA) channel, or a channel that interleaves data over time or frequency, or a packetized access channel, or a code-division multiple access (CDMA) channel, or any combination thereof.

In some embodiments, determining the lead channel comprises selecting, prior to decoding, a given channel in the plurality of channels as the lead channel.

In some embodiments, the given channel has a lowest code rate among the plurality of channels.

In some embodiments, determining the lead channel comprises (a) receiving parallel decodings of the signals in the plurality of channels, and (b) selecting a channel in the plurality of channels as the lead channel on the basis of the parallel decodings.

In some embodiments, selecting the lead channel comprises selecting the channel whose decoding completed first.

In some embodiments, selecting the lead channel comprises using soft information.

In some embodiments, the soft information comprises a least energetic estimated effective noise sequence.

In some embodiments, the soft information comprises a most likely effective noise sequence.

Some embodiments further include determining an estimate of effective noise on the other channel by subtracting the second decoded codeword from the signals in the other channel; and re-decoding the signals in the lead channel using the determined estimate of effective noise on the other channel to form a third decoded codeword that is different than the first decoded codeword.

In some embodiments, the plurality of channels comprise a plurality of time slots created by time division multiplexing, and the correlated, effective noise comprises burst noise.

In some embodiments, the plurality of channels comprise a multiple-input multiple-output (MIMO) system having one or more antennas, and the correlated, effective noise comprises effective noise relating to signals received by each of the one or more antennas.

In some embodiments, the MIMO system comprises a plurality of nodes, each node having a plurality of antennas, the method further comprising two or more nodes in the plurality of nodes sharing with each other information regarding effective noise they have respectively estimated.

Some embodiments further include decoding signals in additional channels in the plurality of channels, each such decoding using a determined estimate of effective noise from a prior decoding.

Some embodiments further include performing successive interference cancellation (SIC) on the plurality of channels.

Some embodiments further include decoding signals according to an interleaving of the plurality of channels.

It is appreciated that the above summary of embodiments is not exhaustive but only illustrative, and that a person having ordinary skill in the art may understand how to implement the concepts, techniques, and structures disclosed herein within other embodiments.

BRIEF DESCRIPTION OF THE DRAWINGS

The manner and process of making and using the disclosed embodiments may be appreciated by reference to the drawings, in which:

FIG. 5 shows a pseudocode listing of an algorithm for performing noise recycling with racing according to an embodiment.

DETAILED DESCRIPTION OF ILLUSTRATIVE EMBODIMENTS

Figure 1:
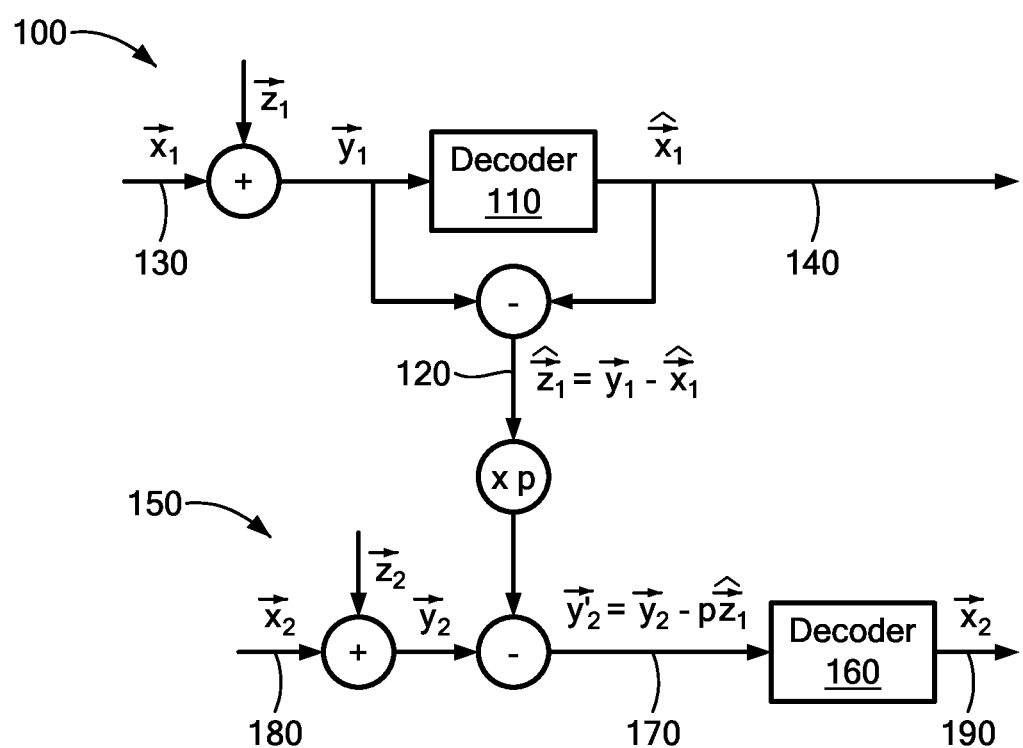
FIG. 1 is a diagram of a system which utilizes noise recycling, in which a estimate of effective noise is created from a lead channel by subtracting its modulated decoding from the received signal; that estimate is used to reduce an effective noise on a channel subject to correlated noise prior to decoding.

In this specification, including the appended claims, the following quoted terms shall have the indicated meanings that are not limited to specific embodiments, except where expressly indicated otherwise:

"Data" refers to symbols that represent useful information.

"Transmission medium" refers to a physical medium used for propagation of signals that encode data.

"Channel" refers to a logical connection for communicating data signals from a data sender to a data receiver using a transmission medium.

"Channel multiplexing" refers to dividing a transmission medium or channel into multiple channels. Commons systems and methods include frequency-division multiplexing ("FDM") in which a usable frequency band is divided into multiple sub-bands; orthogonal FDM ("OFDM") in which the sub-band frequencies are chosen to be orthogonal; time-division multiplexing ("TDM") in which a repetitive transmission interval is divided into multiple time slots; and code-division multiplexing ("CDM") in which data are spread across a usable frequency spectrum using multiple, distinguishable spreading codes.

"Multiple access" refers to a system or method in which different multiplexed channels are assigned to different communications terminals (that may, in turn, be controlled by different individuals or entities). Common systems and methods include frequency-division multiple access ("FDMA"); orthogonal FDMA ("OFDMA"); time-division multiple access ("TDMA"); and code-division multiple access ("CDMA").

"Multiple-input multiple-output" or "MIMO" refers to multiple signal transmit and receive elements (e.g. antennas) being used to increase the capacity of a wireless transmission medium (e.g. air) by exploiting multipath propagation.

"Orthogonal channels" refer to channels whose signals do not interfere according to some property. Illustratively, for TDMA this property is time: channels do not correlate with each other because their respective signals propagate through the transmission medium during non-overlapping time slots.

"Quasi-orthogonal channels" refer to channels whose signals only weakly interfere. Illustratively, CDMA has quasi-orthogonal channels.

"Noise" refers to unwanted modification of signals that were communicated by a data sender on a channel. "Effective noise" refers to a quantitative characterization by a data receiver of any process that has the signal-modifying effect of noise, including but not limited to channel noise and post-reception signal processing noise.

"Block" or "data block" refers to data transmitted, by a data sender on a channel, as a logical unit (e.g. for purposes of detecting or correcting errors due to noise).

"Block error rate" or "BLER" refers to the ratio of a number of erroneous blocks to a total number of blocks that were received by a data receiver from a channel during a given time interval.

Before proceeding with a discussion of noise recycling concepts, it should be appreciated that to promote clarity in the description of the broad concepts sought to be protected herein, some example use cases are discussed below. Such use case are not intended to be, and should not be, construed as limiting. Rather, any specific examples provided herein below are merely instructive of the broad noise recycling concepts, systems and techniques. In particular, two examples are described which illustrate improvements in block error rates (BLER).

In one example, noise recycling and associated systems, devices and techniques are described below with respect to a particular type of correlated, effective noise model across orthogonal channels, Gauss-Markov (GM) noise. The Gauss-Markov process has been used to model progressive decorrelation of effective noise with growing separation among channels in time, frequency, or both. And it is within that example model, that the noise recycling concepts (which embrace effective noise correlation to significantly improve decoding performance while maintaining separate decoding over orthogonal channels) are described. In accordance with the Gauss-Markov noise model, a leading orthogonal channel is decoded first, and propagation of effective noise estimations follows to help decoding of all orthogonal channels.

In another BLER example described below, the noise recycling systems, devices and techniques do not pre-determine which of two orthogonal channels is decoded first. Instead, the decoders of orthogonal channels are run in parallel, in effect racing each other. The first decoder to terminate provides the initial estimate of effective noise for noise recycling. While this approach is not designed to provide rate gains, it yields considerable BLER improvements for short codes. Such an approach may be desirable for low-latency communications, which may utilize high rate short codes.

After reading such examples, as well as the entire disclosure provided herein, those of ordinary skill in the art will appreciate that since noise recycling uses estimates of effective noise, for BLER improvements, noise recycling techniques can be employed with any codes at any rates using any decoders on any channels.

Both rate gain and BLER improvements yielded by noise recycling vis-à-vis independently decoding the channels may be considered. For rate gain, provided hereinbelow is a proof of achievability with an ordering for the successive decoding of orthogonal channels using noise recycling. Rate gains are evaluated numerically, which improve both with correlation and with the number of orthogonal channels for a given correlation. For BLER improvements, the noise recycling technique described herein can work with any codes at any rates using any decoders on any channels, since noise recycling only uses estimates of effective noise.

Noise recycling is distinct from interference cancellation in multiple access channels, where decoded codewords are subtracted from received signals to remove interference. In noise recycling, modulated decoded codewords are subtracted from received signals to recover estimates of effective noise which, owing to correlation across channels, form a component of the noise in another as-yet un-decoded orthogonal channel. A proportion of the estimate can, therefore, be subtracted from the received signal on the orthogonal channel before decoding, reducing the latter's effective noise.

Thus, in non-orthogonal channels subject to both interference and correlated noise, noise recycling and interference cancellation can be used together. When channel responses are perfectly known, in theory there is an equivalence between inter-symbol interference (ISI) or multiple-input multiple-output (MIMO) channels, on the one hand, and colored noise, on the other. It has been used in MIMO systems with Bell Labs' Layered Space-Time (BLAST) schemes. Such systems generally rely on successive interference cancellation (SIC) decoders that can obtain the full performance of joint encoding and decoding when operating on received signals from jointly pre-coded channels. The precoding is effected via the multiplication, prior to transmission, of streams through a matrix Q, which is matched to the channel response H if it is known, or its statistics if only those are available. Unless there is fast fading and isotropic independence in the channel response, H, then Q is not the identity matrix.

However, disclosed embodiments that use noise recycling have two major advantages over such prior art systems. The first is the absence of the matrix Q mentioned above, which can only present for ISI/MIMO systems when there is fast, independent, isotropic fading. The second difference, at the receiver, is successive accumulation of the knowledge of the individual responses, rather than knowledge of the entire matrix H that incorporates them. Embodiments may thus perform interference cancellation even without joint encoding, by making only receiver-side changes relating to sharing of estimates of effective noise between decoders. Removal of correlated noise between decoders allows the receiver to reconstruct the channel response, thereby permitting interference cancellation. Indeed, noise recycling without joint encoding has a rate performance that is, in practical settings, generally close to the joint encoding/decoding, capacity-achieving scheme known in the prior art.

We model illustrative systems in which embodiments may be usefully employed as follows. Let x, $\vec{x}$, X, $\vec{X}$ denote a scalar, vector, random variable, and random vector, respectively. All vectors are row vectors. A linear block code is characterized by a code-length, n, code-dimension, k, [n,k], and rate R=k/n. The binary field is denoted by $F_2$. Mutual information between X, Y is denoted by I(X;Y). Considered is an orthogonal channel system where $i \in \{1, \ldots, m\}$ messages, $\vec{u}_i \in F_2^{k_i}$, are encoded into codewords $\vec{c}_i$. The codewords are modulated into $\vec{x}_i$ and sent over analog orthogonal channels subject to additive noise. Channel outputs are $\vec{Y}_i = \vec{4} + \vec{Z}_i$, where $Z_{i,j}$ is the j-th element of $\vec{Z}_i$. For each i, the orthogonal channels i and i+1 are referred to as sequential orthogonal channels. Noise is assumed to follow a GM model where the j-th element of the i-th noise vector $\vec{Z}_i$ is generated in the following way: $Z_{i,j} = \rho Z_{i-1,j} + \chi_{i,j}$ and the innovation processes, $\{\chi_{i,j}\}$, are all mutually independent and identically distributed, $\chi_{i,j} \sim N(0, (1-\rho^2)\sigma^2)$, so that $Z_{i,j} \sim N(0, \sigma^2)$, for $|\rho| < 1$. The rate of the i-th code is $R_i = k_i/n$, and the total rate is $R = \Sigma_1^m R_i$. Given $(\vec{Y}_1, \ldots, \vec{Y}_m)$ the goal is to estimate $(\vec{x}_1, \ldots, \vec{x}_m)$, using m distinct decoders.

Referring now to FIG. 1, a communication system has a plurality of independent orthogonal channels. In FIG. 1 is shown a first or lead channel 100 and a second channel 150, configured for transmission of coded signals. Lead channel 100 has a decoder 110 and channel 150 has a decoder 160 disposed therein. In general overview, the system of FIG. 1 utilizes a noise recycling technique in which a estimate of effective noise 120 is created from the lead channel 100 by subtracting its modulated decoding 140 from the received signal 130. That estimate of effective noise 120 is used to reduce noise on the other channel 150 subject to correlated noise prior to decoding.

In the example of FIG. 1, two independent channel inputs 130 and 180, shown as vectors $(\vec{x}_1, \vec{x}_2)$ from potentially different codebooks, are provided on the orthogonal channels 100, 150 that are corrupted by the effect of correlated, real-valued, additive, symmetric Gaussian noise $(\vec{Z}_1, \vec{Z}_2)$ with correlation $\rho$. This results in correlated random real-valued channel outputs $(\vec{Y}_1, \vec{Y}_2) = (\vec{x}_1, \vec{x}_2) + (\vec{Z}_1, \vec{Z}_2)$.

Noise-related information from a first channel (or "lead channel") is used so that an accurate inference of an effective noise realization can be obtained to aid the signal at a second channel. In embodiments, the lead channel 100 may or may not be predetermined with respect to the other channel 150. For example, for improvement in rate gain aspects (i.e. for rate gain improvements) it may be desirable to predetermine which channel is the lead channel. However, for improvement in reliability (e.g. for the case of improvements in block error rate (BLER)), the lead channel can be determined during the decoding process. For example, for the block error rate improvements case, the rate of the code can be the same in both channels, or more generally in all channels if there are more than two.

For a particular realization of channel outputs $(\vec{y}_1, \vec{y}_2)$, on decoding the lead channel output $\vec{y}_1$ to its modulated decoding $\hat{x}_1$ (element 140 in the Figure) the decoder 110 estimates the effective noise realization 120 experienced on the lead channel 100 by subtracting the decoded codeword 140 from the received signal: $\hat{z}_1 = \vec{y}_1 - \hat{x}_1$. The second receiver updates its channel output 170 to $\vec{y}_2 = \vec{y}_2 - \rho \hat{z}_1$, eliminating part of the additive, effective noise experienced on the second channel $\vec{z}_2$, before decoding in the decoder 160. This noise recycling results in the second channel output 170 being a less noisy version of the channel input $\vec{x}_2$ (element 180 in the Figure), which in turn leads to improved decoding performance in the decoded output 190.

Considering noise recycling rate gain, one first determines the rate region that can be achieved by sending at a lower rate on one orthogonal channel, estimating the realization of the effective noise in that channel, and using that knowledge to reduce the impact of effective noise in other orthogonal channels.

Assume a GM noise model with m fixed orthogonal channels, each with variance $\sigma^2$, and correlation $\rho$ between sequential orthogonal channels. For a given average power constraint, $E(X_i^2) < P$, and any correlation factor $|\rho| < 1$, the following region is achievable: $C_1 < C(P/\sigma^2)$ and $C_j < C(P/((1-\rho^2)\sigma^2))$, for all $j > 1$, where $C(P/\sigma^2) = 0.5 \log(1+P/\sigma^2)$, and so $P/\sigma^2$ is the Signal to Noise Ratio.

Code construction for achievability is next described. One may create m independent random codebooks such that the j-th code-book consists of $2^{nR_j}$ codewords independently drawn from a distribution with variance P''', where $R_1 < C(P/\sigma^2)$ and $R_j < C(P/(1-\rho^2)\sigma^2)$ for all $j \neq 1$, and a superscript j indicates that a codeword was chosen from the j-th codebook. For each channel, codebooks are known to transmitter and receiver, but each channel need only know its own codebook. The transmitters of the orthogonal channels send $\overrightarrow{X^1(i_1)}, \ldots, \overrightarrow{X^m(i_m)}$. The decoders operate sequentially from $j=1$ to m as follows. With $\overrightarrow{Z_0} = 0$, and $\overrightarrow{Z_{j-1}}$ being the estimate of effective noised from the decoding of the (j−1)-th, the j-the decoder subtracts $\rho \overrightarrow{Z_{j-1}}$ from its channel output $\overrightarrow{Y_j}$, resulting in $\overrightarrow{Y_j'} = \overrightarrow{Y_j} - \rho \overrightarrow{Z_{j-1}}$. It then identifies the decoding that arises from considering as the received signal. Note that it is possible for the j-th decoder to decode in error.

Described below are techniques for use in some illustrative embodiments to achieve rate gains where a low rate code is reliably decoded on a lead channel (which may be a pre-determined one of a plurality of the channels), giving an accurate estimate of the noise on that channel, whereupon a second, higher rate, code can be more reliably decoded on an orthogonal channel subject to correlated noise.

Figure 2A:
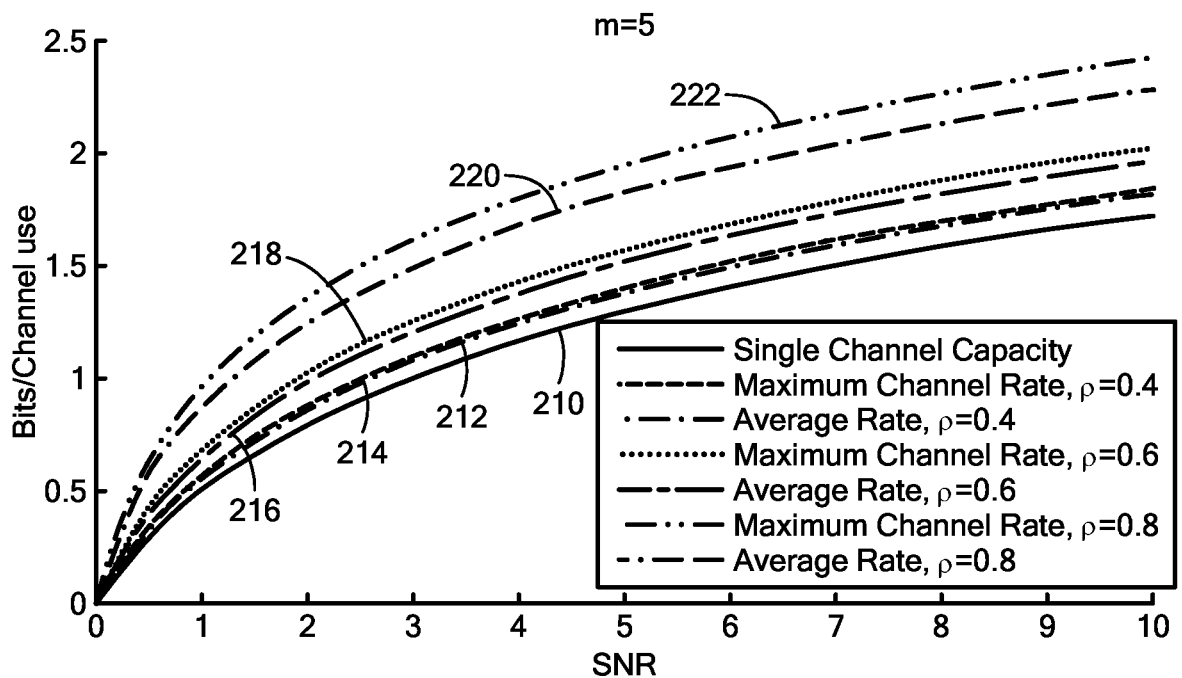
FIGS. 2A, 2B are plots illustrating an achievable regime for a decoder.
Figure 2B:
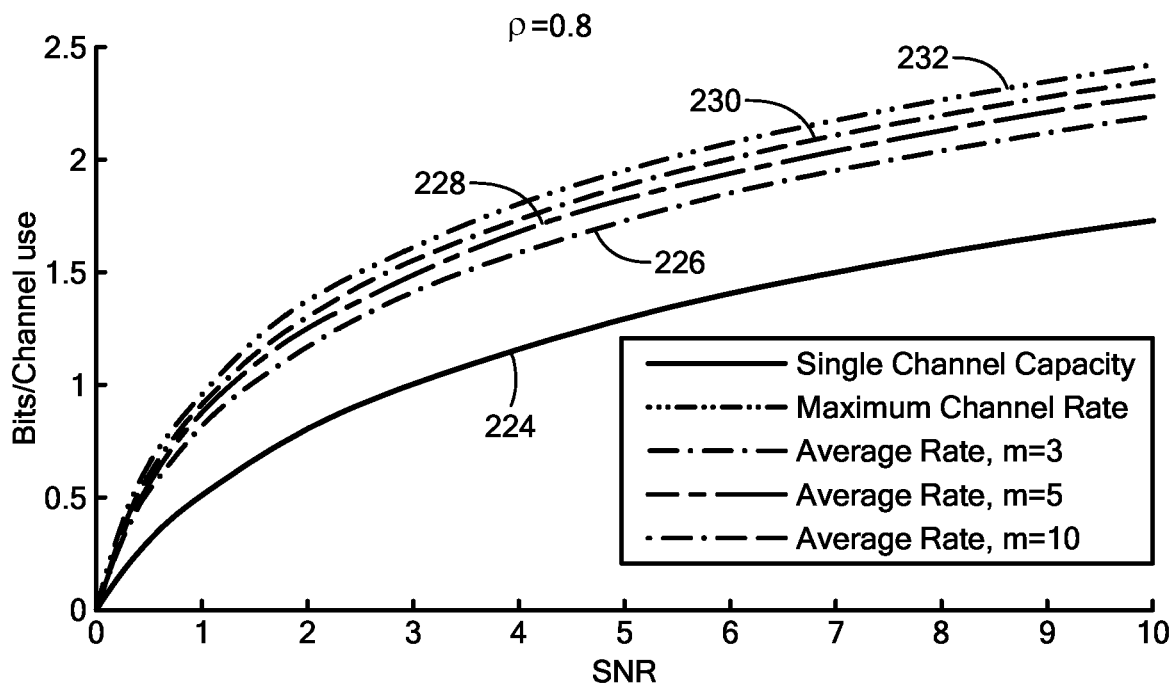

Referring now to FIGS. 2A and 2B, illustrated is the rate that can be gained when compared to the case where channel decoders operate independently. It is evident from FIGS. 2A, 2B that there is a gap between the single-channel capacity and the average rate that can be achieved by noise recycling decoders. In particular, there is a significant rate-gain even when the number of channels, m, or the effective noise correlation, $|\rho|$, is low. It should be noted that FIGS. 2A, 2B illustrates the achievable regime for the decoder described above. The single channel capacity 210 is $C_1 = C(P/\sigma^2) = 0.5 \log(1+P/\sigma^2)$, the capacity of an orthogonal channel that does not use recycled noise, as is the case for the first channel, j=1. The maximum channel rate 214, 218, 222 is the rate of an orthogonal channel decoded with noise recycling $C_j = C(P/((1-\rho^2)\sigma^2))$, j>1. The average rate 212, 216, 220 is the average rate per orthogonal channel, namely $(C_1+(m-1)C_2)/m$.

Above, the rate-gains available from noise recycling were determined. Next, it is illustrated that BLER performance is enhanced by noise recycling for existing codes and decoders.

The noise recycling technique may be demonstrated with CRC-Aided Polar ("CA-Polar") codes, which are polar codes with an outer cyclic redundancy check ("CRC") code. CA-Polar codes have been proposed for fifth generation new radio ("5G NR") control channel communications. Also demonstrated are random linear codes ("RLCs") which are known to achieve full theoretical channel capacity, but have been little investigated owing to the absence of efficient decoders that can work at high rates until recent developments. For decoders, the CA-Polar-specific CRC-Aided Successive Cancellation List decoder (CA-SCL) in MATLAB's Communications Toolbox may be used.

Also, two soft-information variants are described below, based on the recently introduced Guessing Random Additive Noise Decoder (GRAND) as described in K. R. Duffy, J. Li, and M. Médard, "Guessing noise, not code-words," in IEEE Int. Symp. Inf. Theory, 2018, pp. 671-675; and "Capacity-achieving Guessing Random Additive Noise Decoding," IEEE Tran. Inf. Theory, vol. 65, no. 7, pp. 4023-4040, 2019. Both of these variants can decode any block code and are well suited to low-to-moderate redundancy codes. In simulations, the GM channel described above with Binary Phase Shift Keying ("BPSK") modulation may be used.

In some embodiments, a predetermined decoding order approach is used. First considered is a sequential decoding scheme akin to the one described above where a lead channel is decoded and a subsequent channel that has a higher rate is decoded using noise recycled information. Block errors are counted separately on both the lead and subsequent channels as it is possible that the subsequent channel decodes correctly, even if the lead channel is in error.

Figure 3:
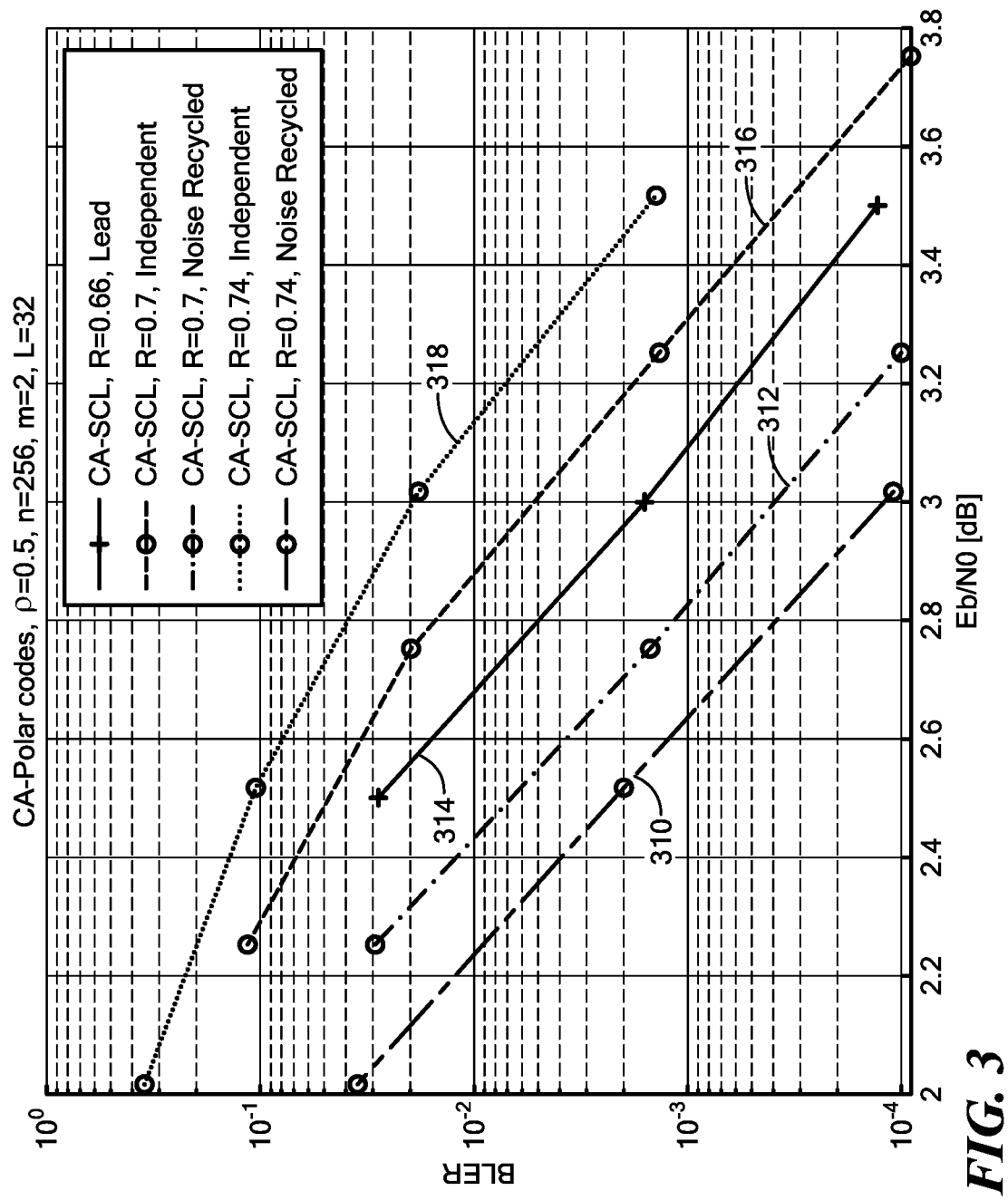
FIG. 3 is a plot of BLER vs. Eb/NO for 256 bit CA-Polar codes decoded with CA-SCL, using a list size of L=32, with and without noise recycling.

Referring now to FIG. 3, shown is a plot of BLER (block error rate) vs Eb/N0 (the energy per information bit used in the transmission) for a simulation of two orthogonal channels experiencing correlated noise. In this simulation, the lead channel encodes its data using a CA-Polar code [256, 170] with rate $R_1 \approx 2/3$. The second, orthogonal channel uses a higher rate CA-Polar code, either [256, 180] or [256, 190] giving $R_2 \approx 0.7$ or 0.74 respectively. The effective noise correlation is set to $\rho = 0.5$ and is known to the second decoder. Both channels are decoded with CA-SCL, with the second channel benefiting from noise recycling, where before decoding the estimate of effective noise of the lead orthogonal channel is subtracted after multiplication by the effective noise correlation factor $\rho$ as shown in FIG. 1.

The line 314 corresponds to the lead channel, while lines 316, 318 give the performance curves if noise recycling is not used, corresponding to independent decoding of all channels. As the second orthogonal channel runs at a higher rate than the lead channel, if it were decoded independently it would experience higher BLER than the lead channel, as FIG. 3 shows. The lines 310, 312 report the performance of the second decoder given noise recycling. Despite using a higher rate code than the lead channel, with noise recycling the second channel experiences better BLER vs Eb/N0 performance. Notably, owing to the better Eb/N0 that comes from running a higher rate code, the rate 0.74 code provides better BLER than the rate 0.7 code. For a commonly used target BLER of $10^{-2}$, noise recycling results in 1 dB gain for the [256, 190] code.

Thus, FIG. 3 illustrates BLER vs. Eb/N0 for 256 bit CA-Polar codes decoded with CA-SCL, using a list size of L=32, with and without noise recycling. The dashed lines 316, 318 correspond to independent decoding, while the solid lines 310, 312 correspond to decoding after noise recycling. The lead orthogonal channel 314 is encoded with a rate 2/3 code. The second channel uses either a rate 0.7 or 0.74 code.

Figure 4:
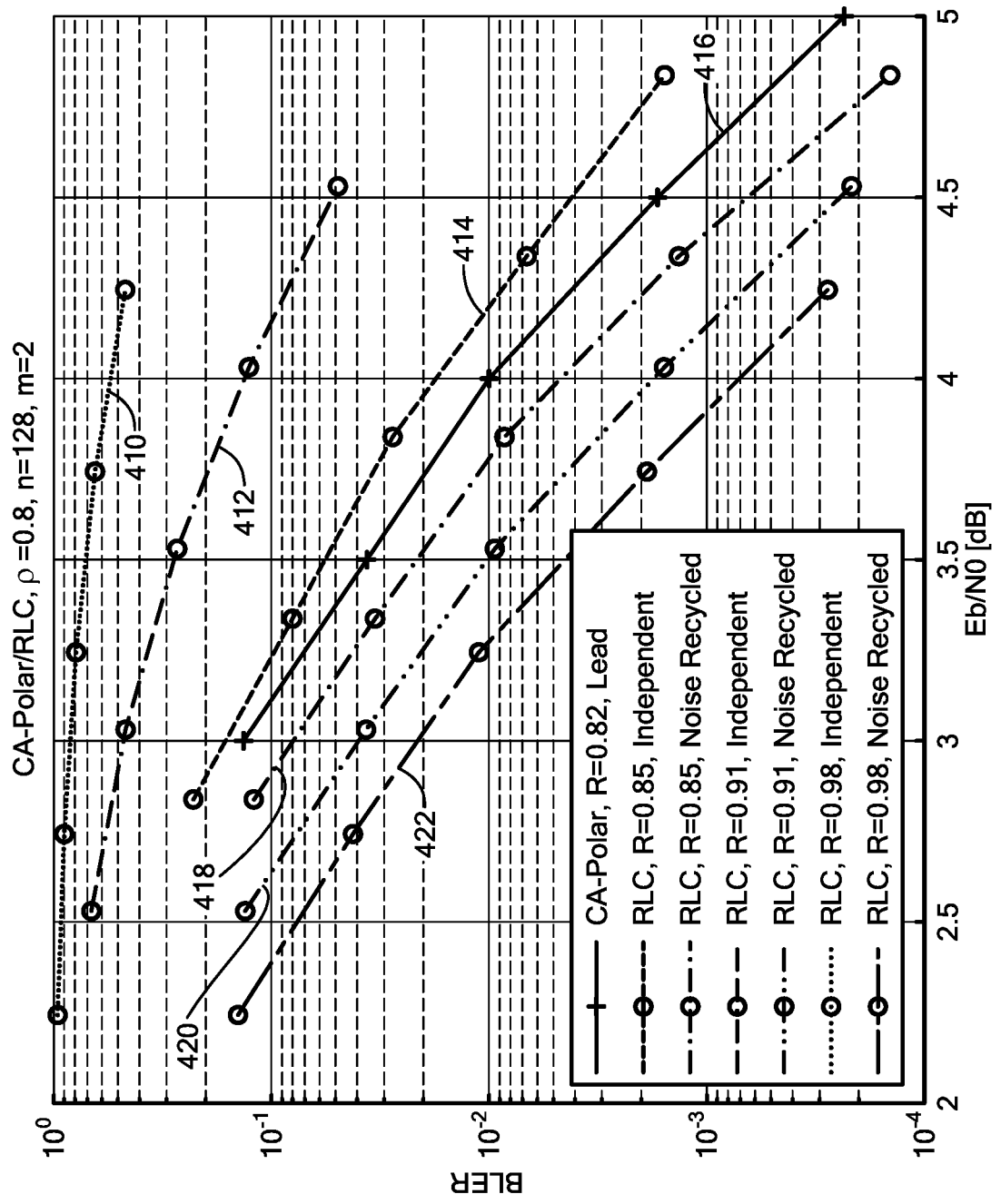
FIG. 4 is a plot of BLER vs. Eb/NO for codes of length n=128 decoded with ORBGRAND with and without noise recycling.

Referring now to FIG. 4, shown is a plot of a simulation analogous to the simulation of FIG. 3, but where $\rho = 0.8$, the lead channel's code is a [128,105] CA-Polar code, $R_1 = 0.82$, and the second channel is one of three RLCs ranging in rate from 0.85 to 0.98. Both channels are decoded with the recently proposed ORBGRAND technique, as described in K. R. Duffy, "Ordered Reliability Bits Guessing Random Additive Noise Decoding," preprint arXiv:2001.00546, 2020. ORBGRAND is a soft detection decoder that provides more accurate decodings of CA-Polar codes than CA-SCL for short codes. As with all the GRAND algorithms, it can decode any code, making it viable for use with RLCs. A similar phenomenology to FIG. 3 can be seen, where the impact of noise recycling is even more dramatic, allowing the second channel code to use reliably a much higher rate than the lead channel.

FIG. 4 shows a plot of BLER vs. Eb/N0 for codes of length n=128 decoded with ORBGRAND with and without noise recycling. Dashed lines 410, 412, and 414 correspond to independent decoding, and solid lines 418, 420, 422 correspond to decoding after noise recycling. Data on the lead orthogonal channel 416 is encoded with a rate 0.82 CA-Polar code. The second channel uses rate 0.85, 0.91 or 0.98 RLCs.

The above description identified rate and BLER improvements that are available from running a pre-determined lead channel with a lower rate code so that an accurate inference of an effective noise realization could be obtained to aid the signal at a higher rate second channel. Next is disclosed an alternate design that can lead to a significant additional gain with both short and long codes: dynamic noise recycling. The principle behind dynamic noise recycling is that, rather than pre-determining the lead channel, all orthogonal channels initially attempt to decode their outputs contemporaneously, and the lead channel is selected as the channel producing the most confident decoding.

For certain types of decoders, speed of decoding provides a measure of confidence in the decoding accuracy and hence the precision of the estimate of effective noise, and the decoders are considered to be "racing" each other. The first decoder to identify a codeword has "won the race" and is designated the lead channel, and the remaining decoders are designated as the "laggers". Sometimes, however, it may be necessary to use a post-decoding, soft-information proxy to determine the decoding with the best confidence. For example, regardless of the decoders employed, one could select the least energetic estimated effective noise sequence or the most likely effective noise sequence. Some decoders, such as those based on the GRAND paradigm, themselves provide soft information on the confidence of their decoding.

In any event, once the lead channel has been determined, the other decoders cease their decodings, remove the recycled estimate of effective noise from the lead channel from their received signal, and resume. Noise recycling continues until all orthogonal channel outputs have been decoded.

An example decoding procedure using "racing" is described in Algorithm 1 shown in FIG. 5. The algorithm operates generally as follows. For example, suppose there are m=3 channels (i.e. first, second and third channels) with each channel having an associated one of first, second and third decoders. At the first step, all decoders decode in parallel. If decoder 2 (i.e. the decoder associated with second channel) is the first to finish decoding, it is declared the winner of the race. The winner acts as lead channel and provides an estimate $\hat{z}_2$ to the first and third decoders (i.e. decoders 1 and 3, in this example) which repeat the process. Mixing-and-matching of decoders, even at different stages of the race, is still possible. This offers, for example, the possibility of using at the race phase a decoder that is highly accurate, but with potentially poor in worst-case runtime. As the race winner will terminate generally quickly, a decoder with uncertain termination time may not necessarily be deleterious in the race phase. Substituting a different deciding algorithm after noise recycling is then a possibility.

The race approach was simulated using a recently proposed technique, Soft GRAND with ABanonment (SGRANDAB) as described in A. Solomon, K. R. Duffy and M. Médard, "Soft Maximum Likelihood Decoding using GRAND," 2020 IEEE International Conference on Communications (ICC), Dublin, Ireland, 2020. SGRANDAB aims to identify the noise that corrupted a transmission from which the codeword can be inferred, rather than identifying the codeword directly. It does this by removing possible noise effects, from most likely to least likely as determined by soft information, from a received signal and querying whether what remains is in the codebook. The first instance that results in success is a maximum likelihood decoding. If no codeword is found before a given number of codebook queries, SGRANDAB abandons decoding and reports an error. The channel that is decoded with the fewest codebook queries by SGRANDAB wins the noise recycling race.

Figure 5A:
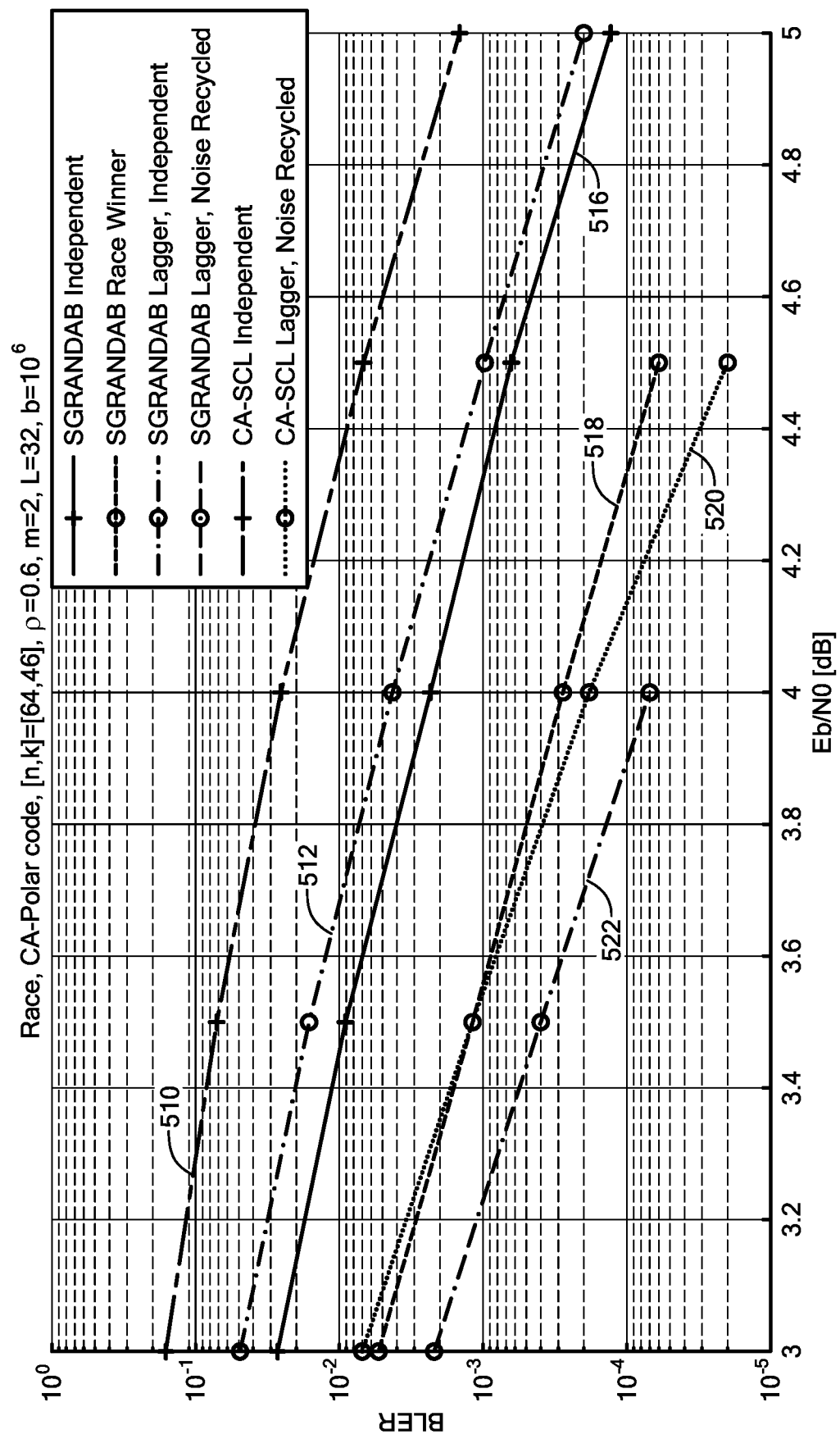
FIGS. 5A, 5B are plots illustrating BLER vs Eb/NO for [64,46] CA-Polar codes according to noise recycling with racing.
Figure 5B:
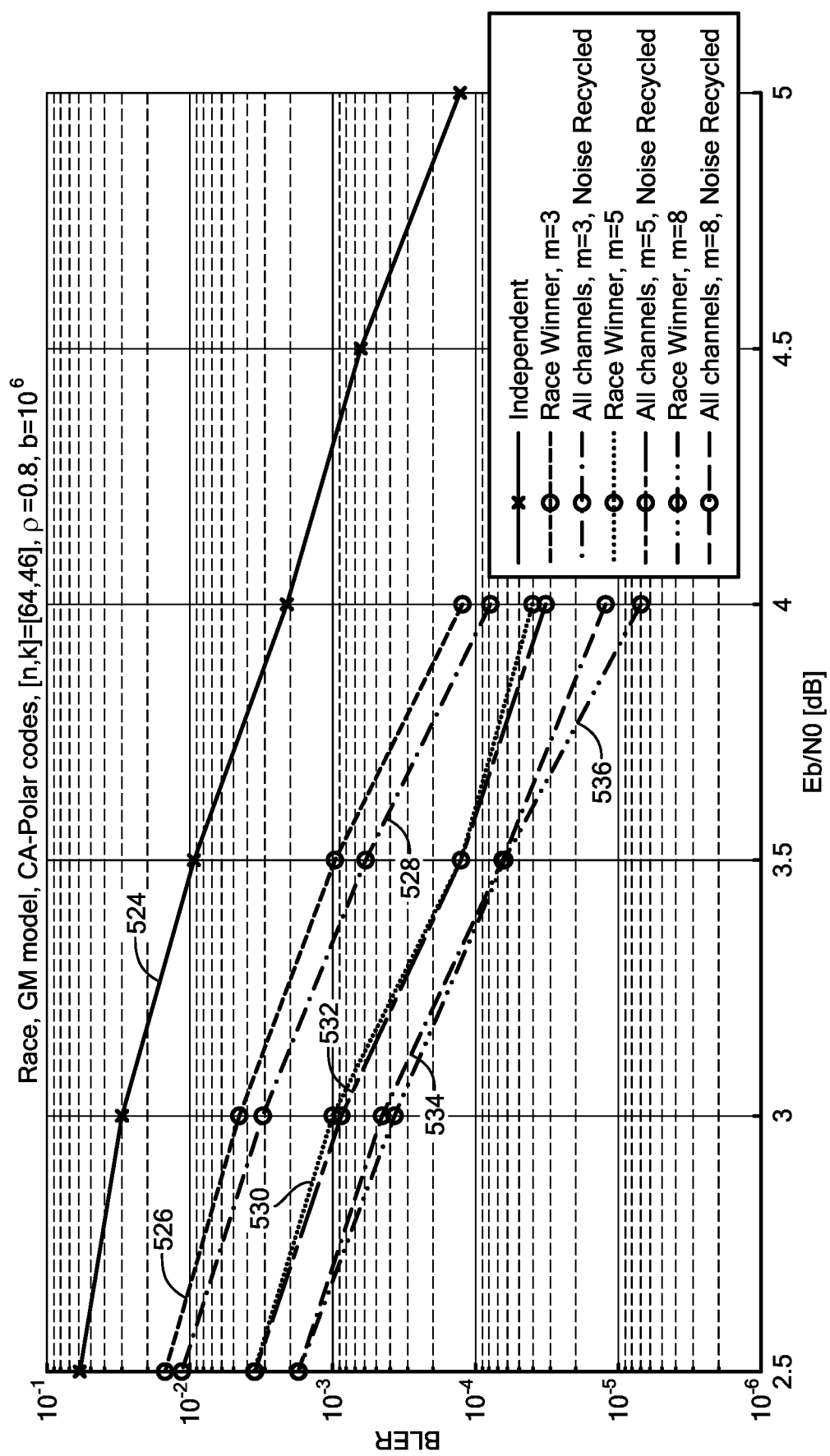

FIGS. 5A, 5B are plots of BLER vs Eb/N0 for [64,46] CA-Polar codes with racing. SGRANDAB, which uses an abandonment threshold of $b=10^6$, is used for the race. In FIG. 5A, either SGRANDAB or CA-SCL, which uses a list size of L=32, are used to decode the laggers after noise recycling. In FIG. 5B, all decoding is done using SGRANDAB.

FIG. 5A shows the BLER of a decoder performance using a noise recycling race technique in the presence of m GM channels using a [64,46] CA-Polar code. FIG. 5A considers the race technique on m=2 orthogonal channels with correlation $\rho=0.6$. As a baseline, curve 510 shows the performance of CA-SCL by itself, while curve 516 shows SGRANDAB by itself. As can be seen from these curves in FIG. 5A, SGRANDAB outperformed CA-SCL without noise recycling, so it gave a better estimate of effective noise and was therefore used to perform the race. Noise-recycled decoding on all the orthogonal channels was then performed using either SGRANDAB or CA-SCL. Curve 518 shows the race winner under SGRANDAB without noise recycling, and curve 512 shows the race loser (i.e. the lagging channel) without noise recycling. Curve 520 shows the effect of applying noise recycling to the lagging channel using CA-SCL, and curve 522 shows its effect using SGRANDAB. The lagging channel benefits from noise recycling, as can be seen by comparing curve 512 to curves 520 and 522. These results again show that a gain of more than 1 dB can be achieved, even for codes of the same rate, by racing noise recycling.

FIG. 5B shows the BLER of a SGRANDAB decoder using a GM noise model for m=3, 5 or 8 channels with correlation $\rho=0.8$. Curve 524 shows SGRANDAB by itself as a baseline. Curve 526 shows the race winner with m=3, and curve 528 shows the average of all 3 channels after noise recycling has been applied. Similarly, curve 530 shows the race winner among m=5 channels, and curve 532 shows the average of the 5 channels after noise recycling. And curve 536 shows the race winner among m=8 channels, with curve 534 showing the average over the 8 channels after noise recycling. The curves in FIG. 5B show an improvement in BLER for all values of m. For example, there is a gain of about 1.7 dB for m=8 and a target BLER of $10^{-4}$. While this race advantage disappears as a consequence of averaging for long codes, it can be seen to provide a significant advantage for short codes.

Next, consider decoders in which the proxy for the most confident decoding is not determined by racing, but rather by the channel whose estimate of effective noise is the most likely. Initially, the i-th decoder decodes its orthogonal channel output $\vec{y}_i$ without noise recycling, and proceeds to compute the log-likelihood of the estimated effective noise $\vec{Z}_i$ for each i∈{1, ..., m}. Using the log-likelihood of the estimate of effective noised at each decoder, the leading decoder is chosen as the decoder whose signal was estimated to have the most likely effective noise. The remaining decoders subtract the correlated portion of the estimated effective noise from their received signals, starting from neighboring orthogonal channels, that leads to higher SNRs. It has been found that for [12800,10000] LDPCs decoded with belief propagation, having long block-lengths where one might expect noise variability between different channels to average out, nevertheless a gain of approximately 1.25 dB is observed between a decoder that does not use noise recycling, and a decoder that does so with m=5 at a target BLER of $10^{-3}$.

In the above results, the lead channel itself pays a price by not benefitting from noise recycling. Although it is potentially counter-intuitive, this need not be the case. Instead, one can "re-recycle" the noise, feeding back a recycled effective noise to the lead channel, re-decode it, and get improved BLER.

In a simulation of a symmetric Gaussian model with two channels employing RLCs decoded with ORBGRAND and a statically chosen lead channel, it was found that the noise-recycled (second, non-lead) channel experiences a ~0.5 dB gain at a target BLER of $10^{-3}$. The lead channel, after noise recycling is used from the second channel and its input is re-decoded, had a performance that slightly outstripped the second channel, also having a ~0.5 dB gain. That is, through noise recycling on the second channel with noise re-recycling on the lead channel, both channels gained ~0.5 dB, and the lead channel is at no disadvantage.

Simulation also was performed using dynamic noise recycling as described above, rather than a statically chosen lead channel as just described. With dynamic noise recycling, each channel was the lead ~50% of the time and the recycled channel ~50% of the time. After applying re-recycling to the dynamically chosen lead channel, a gain was obtained similar to that realized in the statically chosen case.

The above simulations were performed on channels having symmetric or identical rates. Another simulation was done on asymmetric channels using the same class of [64,46] RLCs, but with the second channel having a SNR that was 2 dB lower than that experienced on the first channel. When channel 1 was statically selected as the lead, the performance of channel 2 improved over 2 dB under noise recycling, eliminating the SNR disparity. That is, by first decoding the more reliable channel, the less reliable channel's performance was equalized to that of the first channel. When re-recycling was also used on the first channel, its performance gained ~0.5 dB, and was also improved. However, when the less reliable channel 2 was statically chosen as the lead, owing to the asymmetry in SNR, the performance of channel 1 (now the lagging channel) degraded by ~0.3 dB after noise recycling. This observation emphasizes that, in the presence of asymmetries, static order choice has significant consequences. However, even having chosen channel 2 as the lead, its own performance was significantly enhanced by re-recycling.

Alternate soft information may be used to provide confidence in the accuracy of decoding. Thus, when dynamic noise recycling is employed with ORBGRAND's query count, each channel is a dynamic mixture of being the lead channel and the recycled one—or, if re-recycling is used, a dynamic mixture of being the recycled channel and the re-recycled channel.

Described above are concepts, systems and techniques to recycle noise in orthogonal channels in order to improve communication performance for any combination of codes. The performance improvement is twofold: (1) one improvement is in a rate gain aspect; and (2) another improvement is in a reliability aspect. The concepts, systems and techniques are appropriate for use in orthogonal or quasi-orthogonal channels with correlated effective noise. The noise recycling concepts, systems and techniques described herein are also appropriate for use in wireless communications.

As described above, noise recycling utilizes correlation among channels to create benefits in communication networks. In some systems, channels may be selected with a preference for effective noise correlation among them, with attendant effects in terms of rate and power allocation.

Noise recycling may be used to compensate for temporally correlated noise, e.g. in TDM. To more fully explain this application, in TDM a single channel is divided into multiple sub-channels. This is done by allocating distinct time-slots to distinct communication streams, often in a round-robin fashion. Suppose that the sender wishes to send 64 packets of data, each of which has 64 bits. Instead of transmitting the 64 bits of one packet followed by 64 bits of the second packet and so on, the first 64 bits sent are the first bits of each packet, the second 64 bits are the second bits of each packet, etc. That is, the packets are interleaved in time.

One way of achieving this sort of time interleaving is via a standard matrix interleaver. In this design, the sender fills in a matrix where each row is occupied by a single packet, so that—in this example—it is a square 64×64 bit matrix. Instead of writing each row of the matrix in turn onto the channel, each column is written onto the channel.

Interleaving breaks up the impact of correlated effective noise on the channel. If noise is temporally correlated, and if only one packet is sent at a time, then a bursty noise will affect only that one packet. If the matrix interleaver is used, then several bits in the same location across distinct packets may be impacted.

For standard decoders that assume effective noise is uncorrelated, this is desirable in enhancing their performance. In current practice, the receiver reassembles all 64 packets by effectively writing the received data in a columns of a corresponding 64×64 matrix, and then writing out the rows, each of which now corresponds to a packet. If these packets are equipped with Forward Error Correction, which is generally the case in practical implementations, each packet is decoded independently.

In accordance with the concepts of noise recycling disclosed herein, each of the 64 packets has been sent on an orthogonal channel, created by TDM or another time interleaved system, where effective noise experienced by the j-th bit of packet i is correlated to the effective noise experienced by the j-th bits of packet i−1 and packet i+1 (i.e. the adjacent rows in the matrix). Thus, if we decode, for example packet 1, it is acting as the lead channel. By subtracting the decoded packet from the received signal, we now know the realization of the effective noise experienced on that channel. A proportion of that effective noise can be viewed as being shared with packet 2, so the effective noise realization from packet 1 can be recycled to clean up the received signal for packet 2 before it is decoded. In turn, the effective noise learned from decoding packet 2 can be passed to packet 3, and so on.

Noise recycling may be implemented as a receiver-side modification only. It can be used with any existing codes and decoders, and generates nearly no extra complexity as post decoding a packet just requires a subtraction to determine its estimate of effective noise, and then multiply it by a correlation factor and subtract it from the received signal of its neighboring orthogonal channel before decoding of that packet using the improved signal. The benefit from noise recycling, however, can be more than 1 dB per packet that has been interleaved.

Figure 6:
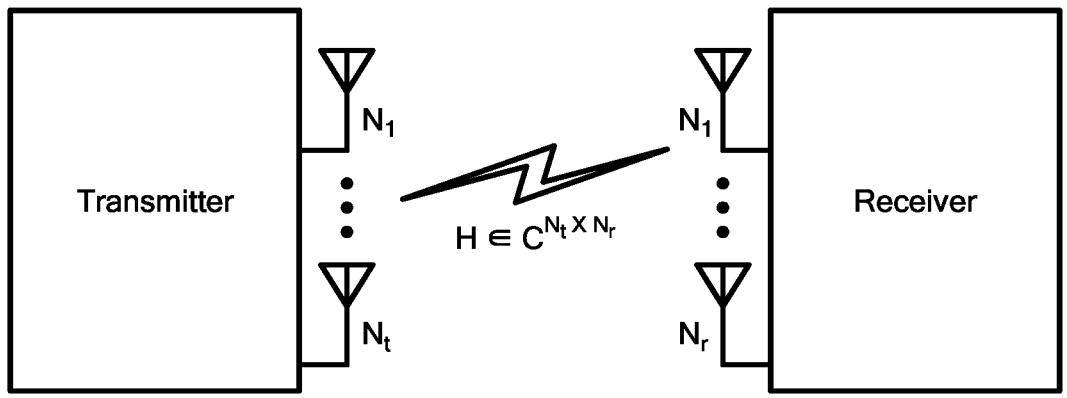
FIG. 6 is a block diagram of a multiple-input multiple-output (MIMO) communication system.

Referring now to FIG. 6, noise recycling in the context of multiple-input multiple-output ("MIMO") communications is described. MIMO systems often have correlated effective noise. In this setting, the transmitters send L independent data streams using $N_t \geq L$ antennas. The receiver is equipped with $N_r$ antennas. The channel is modeled by the matrix $H \in \mathbb{C}^{N_t \times N_r}$ possibly with correlation. A MIMO model is depicted in FIG. 6. A water-filling approach based upon the correlation of the channel, assuming the state of the channel is known at the transmitter can be used. This approach allocates the power and the beam-former degree of freedom ("DOF") to maximize the rate at the receiver.

Using the noise recycling approach, various embodiments use a novel strategy for MIMO communications to filter correlated channel noise. An optimization solution includes the transmitter choosing to increase the power and the DOF's allocations to the antenna (or antennas) that have the maximum effective noise correlation with the other antennas at the receiver. In this strategy, one maximizes the rate at this one antenna (or antennas), which are used to decode also the realization of the noise. Then the receiver can use the estimated effective noise realization to cancel correlated effective noise in the other antennas, thus increasing the rate (or reducing the BLER). The new definition of the proposed optimization problem takes as a goal to increase the total rate or reduce the block error rate by considering how to allocate the power and the DOF's, given that the decoder is able to use the decoded realization of the noise as proposed in the above-described model with the orthogonal channels.

Unlike prior art solutions, if the channel state at the transmitter is not given, the noise recycling approach can still be applied at the receiver independently to increase the total communication rate or reduce the BLER at the receiver.

Figure 7:
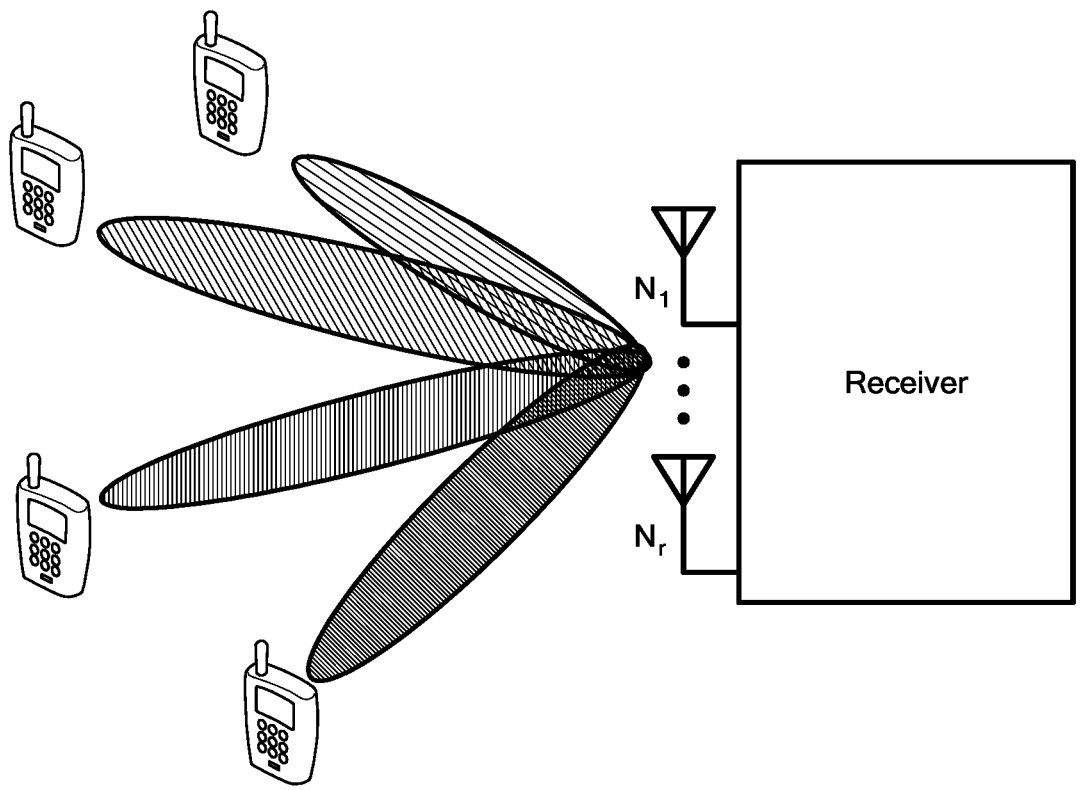
FIG. 7 is a diagram of a multi-user (MU) massive MIMO model.

Referring now to FIG. 7, noise recycling in multi-user (MU) massive MIMO model is described. In the massive MIMO model, the receiver is equipped with many antennas. For example, the receiver may be equipped with orders of magnitude more antennas than in a conventional MIMO setting, e.g., 100 or more antennas may be used. In the multi-user setting, the channel of each user is considered as spatially orthogonal by the antennas at the receiver. A fading channel is modeled with small-scale and large-scale fading channel coefficients. The small-scale coefficients are assumed to be different for different antennas at the receiver, while the large-scale coefficients are the same at all the antennas of the receiver.

In this model, the effective noise at the channel can be considered as correlated noise that can be exploited using the disclosed noise recycling to increase the rate at the receiver, as in ordinary MIMO. However, a directional noise in this model can be considered as a transmitted user signal, in which the spatial correlation of the directional effective noise at the massive antennas of the receiver can be viewed as a correlated noise by the large-fading coefficients. According to this spatial collation, using the noise recycling approach, for example, the receiver can cancel this correlated effective noise at the massive antennas, hence drastically increasing the rate performance.

Accordingly, a noise recycling approach can be extended to cooperative MIMO applications and different nodes share with each other effective noise information regarding the noise they have respectively received at their one or more antennas.

Figure 8:
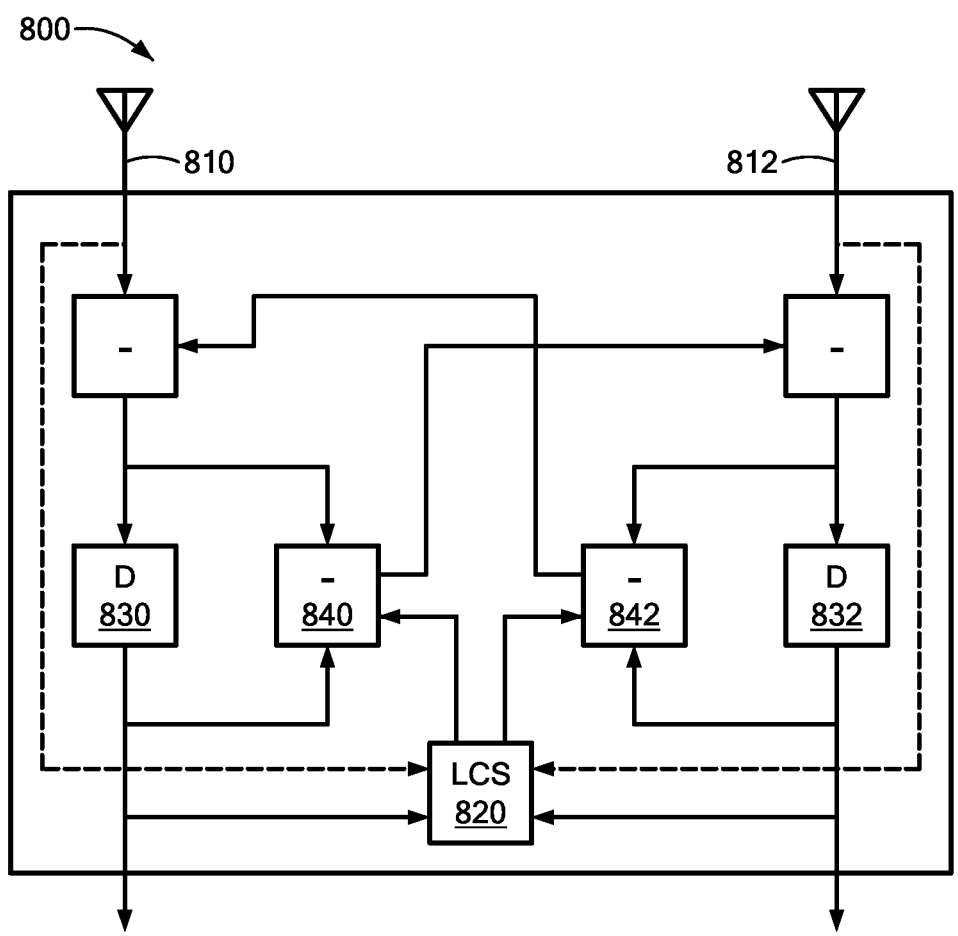
FIG. 8 schematically shows a system for decoding signals according to an embodiment.

In view of the above discussion, in FIG. 8 is shown a system 800 for decoding signals. The system 800 includes one or more antennas, e.g. antennas 810, 812, for receiving a plurality of channels having correlated, effective noise. The antennas 810, 812 may be any antennas as known in the art. The plurality of channels may be orthogonal but for the correlated, effective noise; that is, they would be ideally orthogonal if the noise were absent. The plurality of channels may include a wireless, multiplexing or multiple access channel. In particular, the plurality of channels may include an orthogonal frequency-division multiplexing (OFDM) channel, or a frequency-division multiple access (FDMA) channel, or a time-division multiplexing (TDM) channel, or a time-division multiple access (TDMA) channel, or a channel that interleaves data over time or frequency, or a packetized access channel, or a code-division multiple access (CDMA) channel, or any combination thereof.

It is appreciated that the depiction in FIG. 8 of only two antennas is merely illustrative, and that any number of antennas may be used in various embodiments. It is further appreciated that the antennas may cooperate to receive the plurality of channels, for example as indicated in connection with the MIMO systems of FIGS. 6 and 7. Thus, the depiction in FIG. 8 that each antenna receives only a single channel for decoding should not be taken as limiting the scope of embodiments, and is made only in the interest of clarity.

The system 800 includes a lead channel selector (LCS) 820 for determining a lead channel in the plurality of channels. The LCS 820 may be implemented as a general purpose computing processor, or as hardware such as an application-specific integrated circuit (ASIC) or field-programmable gate array (FPGA), or similar hardware. The LCS 820 receives signals from each of the plurality of channels. In some embodiments, these signals are pre-decoded signals, while in other embodiments they are post-decoded codewords. As these signals arrive from different points in the flow of data through the system 800, the various inputs to the LCS 820 are indicated using dashed lines to symbolize these different options. The LCS 820 may also take as input signals encoding other information, such as soft information as described above. These other input signals are omitted for clarity.

The LCS 820 may operate in some embodiments by selecting, prior to decoding, a given channel in the plurality of channels as the lead channel. As described above in more detail, the given channel may be the channel having a lowest code rate among the plurality of channels, and may be pre-determined.

The LCS 820 may operate in other embodiments by first receiving parallel decodings of the signals received by the one or more antennas, then selecting a channel in the plurality of channels as the lead channel on the basis of the parallel decodings. In some embodiments, the lead channel is the channel whose decoding completed first, as described first below. In other embodiments, the LCS 820 uses soft information to determine the lead channel, as described later below. Soft information may include, illustratively, a least energetic estimated effective noise sequence or a most likely effective noise sequence, or other soft information known in the art.

The system 800 also includes decoders for decoding signals in the plurality of channels. Illustratively in FIG. 8, there are two channels, and thus two decoders 830 and 832.

It is appreciated that embodiments should include a number of decoders at least equal to, if not greater than, the number of channels to be simultaneously decoded. The LCS 820 determines which channel is the lead channel and which is the lagging channel (or channels, if more than two are present), and thereby determines which of the decoders 830, 832 is the first, or lead channel, decoder and which is the second, or lagging channel, decoder. The first decoder decodes signals in the lead channel to form a first decoded codeword.

The system 800 also includes a subtraction unit for determining an estimate of effective noise on the lead channel by subtracting the first decoded codeword from the signals received in the lead channel. If the first decoder is decoder 830 then the subtraction unit is unit 840, while if the first decoder is decoder 832 then the subtraction unit is unit 842.

The second decoder (whether decoder 830 or decoder 832) decodes signals in the lagging channel using the determined estimate of effective noise on the lead channel to form a second decoded codeword. The LCS 820 illustratively facilitates this process by enabling or disabling the subtraction units 840 and 842 as appropriate.

In some embodiments, the second subtraction unit may be used for determining an estimate of effective noise on the other channel by subtracting the second decoded codeword from the signals in the other channel. That is, both subtraction units may be used. In this case, the first decoder is configured for re-decoding the signals in the lead channel using the determined estimate of effective noise on the other channel to form a third decoded codeword that is different than the first decoded codeword. This third decoded codeword is produced using a lesser effective noise on the lead channel, and thus one may have a higher confidence, relative to the first codeword, that it was correctly decoded. In this way, noise from the second channel may be "re-recycled" as described above in detail.

In some embodiments, the plurality of channels comprise a plurality of time slots created by time division multiplexing (e.g. in a TDM system, or other time interleaved system), for which the system 800 is a TDM receiver. The correlated, effective noise may be burst noise, which the system 800 is especially suited to correct. In other embodiments, especially those which are part of a MIMO system, the correlated, effective noise relates to signals received by each of the one or more antennas. If multiple nodes are present in a cooperative MIMO environment, two or more of the nodes may share with each other information regarding noise they have received by their respective plurality of antennas.

Figure 9:
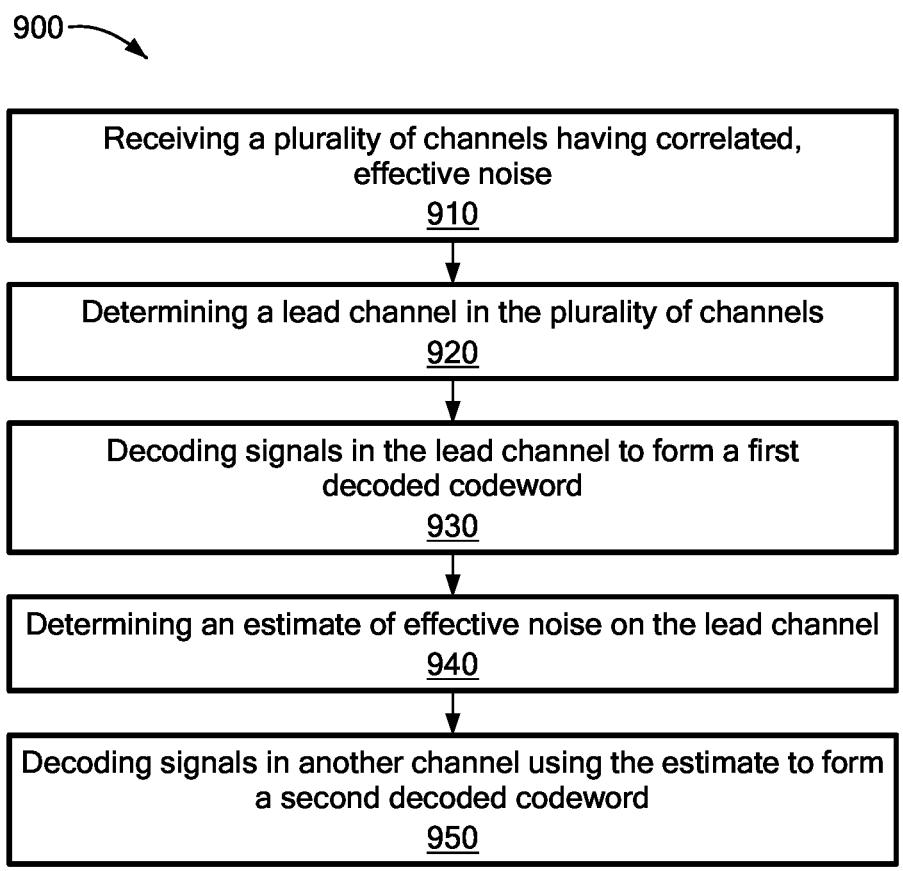
FIG. 9 is a flowchart of a method of decoding signals according to an embodiment.

Referring now to FIG. 9, there is shown a flowchart for a method 900 of decoding signals according to an embodiment of the concepts, techniques, and structures disclosed herein. Illustratively, the method 900 may be performed by the system 800 of FIG. 8, or by other hardware and/or software including those found in a general purpose computer.

The method 900 begins with a process 910 receiving a plurality of channels having correlated, effective noise, which may be obtained with one or more antennas or other inputs. The plurality of channels may be orthogonal but for the correlated, effective noise. The plurality of channels may comprise a wireless, multiple access channel. The plurality of channels may include an orthogonal frequency-division multiplexing (OFDM) channel, or a frequency-division multiple access (FDMA) channel, or a time-division multiplexing (TDM) channel, or a time-division multiple access (TDMA) channel, or a channel that interleaves data over time or frequency, or a packetized access channel, or a code-division multiple access (CDMA) channel, or any combination thereof.

The method 900 continues with a process 920 determining a lead channel in the plurality of channels, illustratively by a lead channel selector as described above. In particular, this may include selecting, prior to decoding, a given channel in the plurality of channels as the lead channel. The given channel may have a lowest code rate among the plurality of channels. Alternately, process 920 may include receiving parallel decodings of the signals in the plurality of channels, and selecting a channel in the plurality of channels as the lead channel on the basis of the parallel decodings.

There are several options for selecting the lead channel dynamically. In some embodiments, selecting the lead channel comprises selecting the channel whose decoding completed first, while in others selecting the lead channel comprises using soft information. In the latter case, the soft information may include a least energetic estimated effective noise sequence or a most likely effective noise sequence.

The method 900 advances to a process 930 decoding signals in the lead channel to form a first decoded codeword, which may be performed by any conventional decoder. The method 900 then has a process 940 determining an estimate of effective noise on the lead channel, which may be accomplished by subtracting the first decoded codeword from the signals received in the lead channel as described above in detail. The method 900 finished with a process 950 decoding signals in another channel in the plurality of channels using the determined estimate of effective noise on the lead channel to form a second decoded codeword.

Some embodiments re-recycle noise. In these embodiments, the method 900 further includes determining an estimate of effective noise on the other channel by subtracting the second decoded codeword from the signals in the other channel; and re-decoding the signals in the lead channel using the determined estimate of effective noise on the other channel to form a third decoded codeword that is different than the first decoded codeword.

In some embodiments, the plurality of channels comprise a plurality of time slots created by time division multiplexing, and the correlated, effective noise comprises bursty effective noise. In other embodiments, the plurality of channels comprise a multiple-input multiple-output (MIMO) system having a plurality of antennas, and the correlated, effective noise relates to signals received by each of the one or more antennas. The MIMO system may have a plurality of nodes, each node having a plurality of antennas, the method further comprising two or more nodes in the plurality of nodes sharing with each other information regarding effective noise they have respectively estimated.

After reading the disclosure provided herein, it should now be appreciated that the techniques and structures described herein may be implemented in any of a variety of different forms. For example, features of the concepts described herein may be embodied within various forms of communication devices, both wired and wireless; television sets; set top boxes; audio/video devices; laptop, palmtop, desktop, and tablet computers with or without wireless capability; personal digital assistants (PDAs); telephones; pagers; satellite communicators; cameras having communication capability; network interface cards (NICs) and other network interface structures; base stations; access points; integrated circuits; as instructions and/or data structures stored on machine readable media; and/or in other formats. Examples of different types of machine readable media that may be used include floppy diskettes, hard disks, optical disks, compact disc read only memories (CD-ROMs), digital video disks (DVDs), Blu-ray disks, magneto-optical disks, read only memories (ROMs), random access memories (RAMs), erasable programmable ROMs (EPROMs), electrically erasable programmable ROMs (EEPROMs), magnetic or optical cards, flash memory, and/or other types of media suitable for storing electronic instructions or data.

In the foregoing detailed description, various features of the invention are grouped together in one or more individual embodiments for streamlining the disclosure. This method of disclosure is not to be interpreted as reflecting an intention that the claimed concepts described herein require more features than are expressly recited in each claim. Rather, inventive aspects may lie in less than all features of each disclosed embodiment.

Having described implementations which serve to illustrate various concepts, structures, and techniques which are the subject of this disclosure, it will now become apparent to those of ordinary skill in the art that other implementations incorporating these concepts, structures, and techniques may be used. Accordingly, it is submitted that that scope of the patent should not be limited to the described implementations but rather should be limited only by the spirit and scope of the following claims.

What is claimed is:

1. A system for decoding signals, the system comprising:
one or more antennas for receiving a plurality of channels having correlated, effective noise;
a lead channel selector for determining a lead channel in the plurality of channels;
a first decoder for decoding signals in the lead channel to form a first decoded codeword;
a subtraction unit for determining an estimate of effective noise on the lead channel by subtracting the first decoded codeword from the signals received in the lead channel; and
a second decoder for decoding signals in another channel in the plurality of channels using the determined estimate of effective noise on the lead channel to form a second decoded codeword.

2. The system according to claim 1, wherein the plurality of channels would be orthogonal or quasi-orthogonal but for the correlated, effective noise.

3. The system according to claim 1, wherein the plurality of channels comprises a wireless, multiple access channel.

4. The system according to claim 1, wherein the plurality of channels comprise: an orthogonal frequency-division multiplexing (OFDM) channel, or a frequency-division multiple access (FDMA) channel, or a time-division multiplexing (TDM) channel, or a time-division multiple access (TDMA) channel, or a channel that interleaves data over time or frequency, or a packetized access channel, or a code-division multiple access (CDMA) channel, or any combination thereof.

5. The system according to claim 1, wherein the lead channel selector operates by selecting, prior to decoding, a given channel in the plurality of channels as the lead channel.

6. The system according to claim 5, wherein the given channel has a lowest code rate among the plurality of channels.

7. The system according to claim 1, wherein the lead channel selector operates by (a) receiving parallel decodings of the signals received by the one or more antennas, and (b) selecting a channel in the plurality of channels as the lead channel on the basis of the parallel decodings.

8. The system according to claim 7, wherein the lead channel selector operates by selecting the channel whose decoding completed first.

9. The system according to claim 7, wherein the lead channel selector operates using soft information.

10. The system according to claim 9, wherein the soft information comprises a least energetic estimated effective noise sequence.

11. The system according to claim 9, wherein the soft information comprises a most likely effective noise sequence.

12. The system according to claim 1, further comprising:
a second subtraction unit for determining an estimate of effective noise on the other channel by subtracting the second decoded codeword from the signals in the other channel;
wherein the first decoder is configured for re-decoding the signals in the lead channel using the determined estimate of effective noise on the other channel to form a third decoded codeword that is different than the first decoded codeword.

13. The system according to claim 1, wherein the plurality of channels comprise a plurality of time slots created by time division multiplexing, and the correlated, effective noise comprises burst noise.

14. The system according to claim 1, comprising a multiple-input multiple-output (MIMO) system, wherein the correlated, effective noise comprises effective noise relating to signals received by each of the one or more antennas.

15. The system according to claim 14, further comprising a plurality of nodes, each node having a plurality of antennas, wherein two or more of the nodes share with each other information regarding effective noise that they have received by their respective plurality of antennas.

16. The system according to claim 1, further comprising a plurality of additional decoders for decoding signals in respective additional channels in the plurality of channels, each such additional decoder using a determined estimate of effective noise on another decoder.

17. The system according to claim 1, wherein the first and second decoders perform successive interference cancellation (SIC) on the plurality of channels.

18. The system according to claim 1, wherein the first and second decoder are configured for decoding signals according to an interleaving of the plurality of channels.

19. A method of decoding signals, the method comprising:
receiving a plurality of channels having correlated, effective noise;
determining a lead channel in the plurality of channels;
decoding signals in the lead channel to form a first decoded codeword;
determining an estimate of effective noise on the lead channel by subtracting the first decoded codeword from the signals received in the lead channel; and
decoding signals in another channel in the plurality of channels using the determined estimate of effective noise on the lead channel to form a second decoded codeword.

20. The method according to claim 19, wherein the plurality of channels would be orthogonal or quasi-orthogonal but for the correlated, effective noise.

21. The method according to claim 19, wherein the plurality of channels comprises a wireless, multiple access channel.

22. The method according to claim 19, wherein the plurality of channels comprise: an orthogonal frequency-division multiplexing (OFDM) channel, or a frequency-division multiple access (FDMA) channel, or a time-division multiplexing (TDM) channel, or a time-division multiple access (TDMA) channel, or a channel that interleaves data over time or frequency, or a packetized access channel, or a code-division multiple access (CDMA) channel, or any combination thereof.

23. The method according to claim 19, wherein determining the lead channel comprises selecting, prior to decoding, a given channel in the plurality of channels as the lead channel.

24. The method according to claim 23, wherein the given channel has a lowest code rate among the plurality of channels.

25. The method according to claim 19, wherein determining the lead channel comprises (a) receiving parallel decodings of the signals in the plurality of channels, and (b) selecting a channel in the plurality of channels as the lead channel on the basis of the parallel decodings.

26. The method according to claim 25, wherein selecting the lead channel comprises selecting the channel whose decoding completed first.

27. The method according to claim 25, wherein selecting the lead channel comprises using soft information.

28. The method according to claim 27, wherein the soft information comprises a least energetic estimated effective noise sequence.

29. The method according to claim 27, wherein the soft information comprises a most likely effective noise sequence.

30. The method according to claim 19, further comprising:
determining an estimate of effective noise on the other channel by subtracting the second decoded codeword from the signals in the other channel; and
re-decoding the signals in the lead channel using the determined estimate of effective noise on the other channel to form a third decoded codeword that is different than the first decoded codeword.

31. The method according to claim 19, wherein the plurality of channels comprise a plurality of time slots created by time division multiplexing, and the correlated, effective noise comprises burst noise.

32. The method according to claim 19, wherein the plurality of channels comprise a multiple-input multiple-output (MIMO) system having one or more antennas, and the correlated, effective noise comprises effective noise relating to signals received by each of the one or more antennas.

33. The method according to claim 32, wherein the MIMO system comprises a plurality of nodes, each node having a plurality of antennas, the method further comprising two or more nodes in the plurality of nodes sharing with each other information regarding effective noise they have respectively estimated.

34. The method according to claim 19, further comprising decoding signals in additional channels in the plurality of channels, each such decoding using a determined estimate of effective noise from a prior decoding.

35. The method according to claim 19, further comprising performing successive interference cancellation (SIC) on the plurality of channels.

36. The method according to claim 19, further comprising decoding signals according to an interleaving of the plurality of channels.

\* \* \* \* \*